US008923172B2

(12) United States Patent
Wentink et al.

(10) Patent No.: US 8,923,172 B2
(45) Date of Patent: Dec. 30, 2014

(54) DETERMINISTIC BACKOFF CHANNEL ACCESS

(75) Inventors: Maarten Menzo Wentink, Naarden (NL); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 12/860,746

(22) Filed: Aug. 20, 2010

(65) Prior Publication Data

US 2011/0044298 A1    Feb. 24, 2011

Related U.S. Application Data

(60) Provisional application No. 61/236,422, filed on Aug. 24, 2009, provisional application No. 61/312,175, filed on Mar. 9, 2010.

(51) Int. Cl.
| | |
|---|---|
| *H04B 7/00* | (2006.01) |
| *H04L 1/16* | (2006.01) |
| *H04W 56/00* | (2009.01) |
| *H04L 5/00* | (2006.01) |
| *H04B 7/04* | (2006.01) |
| *H04L 1/18* | (2006.01) |

(52) U.S. Cl.
CPC ......... *H04L 1/1621* (2013.01); *H04W 56/0045* (2013.01); *H04B 7/0452* (2013.01); *H04L 5/0023* (2013.01); *H04L 1/1671* (2013.01); *H04L 1/1685* (2013.01); *H04L 1/1854* (2013.01)
USPC ....................................................... 370/310

(58) Field of Classification Search
CPC ..... H04W 76/02; H04W 76/04; H04W 74/08; H04W 74/0816; H04W 74/0825
USPC ................ 370/310, 431, 432, 443–448, 462; 709/227–229
See application file for complete search history.

(56) References Cited

U.S. PATENT DOCUMENTS

| | | | | |
|---|---|---|---|---|
| 7,046,650 | B2 * | 5/2006 | Sherman ........................ | 370/338 |
| 7,120,852 | B2 * | 10/2006 | Terry et al. ..................... | 714/776 |
| 7,180,905 | B2 * | 2/2007 | Benveniste .................... | 370/445 |
| 7,245,604 | B2 * | 7/2007 | Benveniste .................... | 370/338 |

(Continued)

FOREIGN PATENT DOCUMENTS

| | | |
|---|---|---|
| CN | 101048977 A | 10/2007 |
| EP | 1589704 A2 | 10/2005 |

(Continued)

OTHER PUBLICATIONS

International Search Report and Written Opinion—PCT/US2010/046448, International Search Authority—European Patent Office—Nov. 26, 2010, 9 pages.

(Continued)

*Primary Examiner* — Dmitry H Levitan
(74) *Attorney, Agent, or Firm* — Kevin T. Cheatham

(57) ABSTRACT

Certain aspects of the present disclosure provide techniques for determining timing of transmit opportunities for wireless stations. According to certain aspects, an access point transmits a downlink transmission containing a deterministic slot count. A station receiving the downlink transmission may determining timing of a transmit opportunity for transmitting a return frame based, at least in part, on the deterministic slot count.

38 Claims, 24 Drawing Sheets

(56) References Cited

U.S. PATENT DOCUMENTS

| | | | |
|---|---|---|---|
| 7,729,319 B2* | 6/2010 | Hirano | 370/336 |
| 7,804,842 B2* | 9/2010 | Malik et al. | 370/445 |
| 7,808,941 B2* | 10/2010 | Ramos et al. | 370/310 |
| 7,944,940 B2* | 5/2011 | Ma et al. | 370/447 |
| 8,189,526 B2* | 5/2012 | Hsu et al. | 370/329 |
| 8,422,450 B2* | 4/2013 | He et al. | 370/329 |
| 8,498,275 B2* | 7/2013 | Wentink | 370/336 |
| 8,553,548 B2* | 10/2013 | Liu et al. | 370/235 |
| 2004/0071154 A1 | 4/2004 | Wentink | |
| 2004/0095911 A1 | 5/2004 | Benveniste et al. | |
| 2005/0238016 A1 | 10/2005 | Nishibayashi et al. | |
| 2008/0013496 A1* | 1/2008 | Dalmases et al. | 370/336 |
| 2008/0273513 A1 | 11/2008 | Montojo et al. | |
| 2010/0135319 A1* | 6/2010 | Wang et al. | 370/445 |

FOREIGN PATENT DOCUMENTS

| | | |
|---|---|---|
| JP | 2005311920 A | 11/2005 |
| JP | 2007525092 A | 8/2007 |
| JP | 2009523371 A | 6/2009 |
| JP | 2010527543 | 8/2010 |
| JP | 2010531109 A | 9/2010 |
| WO | WO-2005004500 A2 | 1/2005 |
| WO | WO-2005062793 A2 | 7/2005 |
| WO | 2007082229 A2 | 7/2007 |
| WO | 2008137864 | 11/2008 |
| WO | WO-2009002296 A1 | 12/2008 |
| WO | WO2010088535 | 8/2010 |

OTHER PUBLICATIONS

Taiwan Search Report—TW099128311—TIPO—Aug. 2, 2013.

* cited by examiner

DETERMINISTIC BACKOFF CHANNEL ACCESS

CLAIM OF PRIORITY UNDER 35 U.S.C. §119

The present Application for Patent claims priority to U.S. Provisional Application Nos. 61/236,422, entitled, "Deterministic Backoff Channel Access," filed Aug. 24, 2009, and 61/312,175, entitled, "Deterministic Backoff Channel Access," filed Mar. 9, 2009, both assigned to the assignee hereof and hereby expressly incorporated by reference herein.

BACKGROUND

1. Field

Certain aspects of the present disclosure generally relate to apparatus and methods for efficiently organizing response transmit opportunities from several receivers in wireless local area network systems. More particularly, the disclosure relates to providing the addressed receivers with a deterministic backoff.

2. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters).

In wireless communications systems, medium access (MAC) protocols are designed to operate to exploit several dimensions of freedom offered by the air link medium. The most commonly exploited dimensions of freedom are time and frequency. For example, in the IEEE 802.11 MAC protocol, the "time" dimension of freedom is exploited through the CSMA (Carrier Sense Multiple Access). The CSMA protocol attempts to ensure that no more than one transmission occurs during a period of potential high interference. Similarly, the "frequency" dimension of freedom can be exploited by using different frequency channels.

Recent developments have led to space as a dimension being a viable option to be used to increase, or at least more efficiently use, existing capacity. Spatial Division Multiple Access (SDMA) can be used for improving utilization of the air link by scheduling multiple terminals for simultaneous transmission and reception. Data is sent to each of the terminals using spatial streams. For example, with SDMA, a transmitter forms orthogonal streams to individual receivers. Such orthogonal streams can be formed because the transmitter has several antennas and the transmit/receive channel consists of several paths. Receivers may also have one or more antennas (MIMO, SIMO). For this example, it is assumed that the transmitter is an access point (AP) and the receivers are stations (STAs). The streams are formed such that a stream targeted at STA-B, for example, is seen as low power interference at STA-C, STA-D, ..., etc., and this will not cause significant interference and most likely be ignored. In order to form these orthogonal streams, the AP needs to have channel state information (CSI) from each of the receiving STAs. Although CSI can be measured and communicated in several ways, thereby adding complexity, the use of CSI will optimize the configuration of SDMA streams.

Additional complexities arise when MIMO is applied to multi-user (MU) systems. For example, typically, the AP controls the uplink (UL) communication process. However, in certain configurations, the uplink scheduling approach still requires that STAs contend with the AP for channel access. In other words, the AP will act as an additional STA trying to gain access to the transmission medium, thereby affecting all STAs attempting to gain access. Further, as the STAs rely on the AP for scheduling of future UL transmissions, the scheduling scheme does not always work well with certain types of data traffic, such as bursty data traffic.

SUMMARY

Certain aspects of the present disclosure provide a method for wireless communications. The method generally includes receiving a downlink transmission containing a deterministic slot count and determining timing of a transmit opportunity for transmitting a return frame based, at least in part, on the deterministic slot count.

Certain aspects provide a method for wireless communications. The method generally includes setting a NAV for downlink transmissions to one or more stations, sending, to a station, a downlink transmission comprising a deterministic slot for use by the station in determining a transmit opportunity, and receiving, prior to expiration of the NAV setting, an uplink transmission from the station transmitted in a determined transmit opportunity.

Certain aspects of the present disclosure provide an apparatus for wireless communications. The apparatus generally includes means for receiving a downlink transmission containing a deterministic slot count and means for determining timing of a transmit opportunity for transmitting a return frame based, at least in part, on the deterministic slot count.

Certain aspects of the present disclosure provide an apparatus for wireless communications. The apparatus generally includes means for setting a NAV period for downlink transmissions to one or more stations, means for sending, to a station, a downlink transmission comprising a deterministic slot count for use by the station in determining a transmit opportunity, and means for receiving, prior to expiration of the NAV period, an uplink transmission from the station transmitted in a determined transmit opportunity.

Certain aspects of the present disclosure provide an apparatus for wireless communications. The apparatus generally includes at least one processor configured to receive a downlink transmission containing a deterministic slot count, and determine timing of a transmit opportunity for transmitting a return frame based, at least in part, on the deterministic slot count; and a memory coupled with the at least one processor.

Certain aspects of the present disclosure provide an apparatus for wireless communications. The apparatus generally includes at least one processor configured to set a NAV period for downlink transmissions to one or more stations, send, to a station, a downlink transmission comprising a deterministic slot count for use by the station in determining a transmit opportunity, and receive, prior to expiration of the NAV period, an uplink transmission from the station transmitted in a determined transmit opportunity; and a memory coupled with the at least one processor.

Certain aspects provide a computer-program product for wireless communications, comprising a computer-readable medium comprising instructions. The instructions are generally executable for receiving a downlink transmission containing a deterministic slot count and determining timing of a transmit opportunity for transmitting a return frame based, at least in part, on the deterministic slot count.

Certain aspects provide a computer-program product for wireless communications, comprising a computer-readable medium comprising instructions. The instructions are generally executable for setting a NAV period for downlink transmissions to one or more stations, sending, to a station, a downlink transmission comprising a deterministic slot count for use by the station in determining a transmit opportunity, and receiving, prior to expiration of the NAV period, an uplink transmission from the station transmitted in a determined transmit opportunity

DETAILED DESCRIPTION

Figure 1:
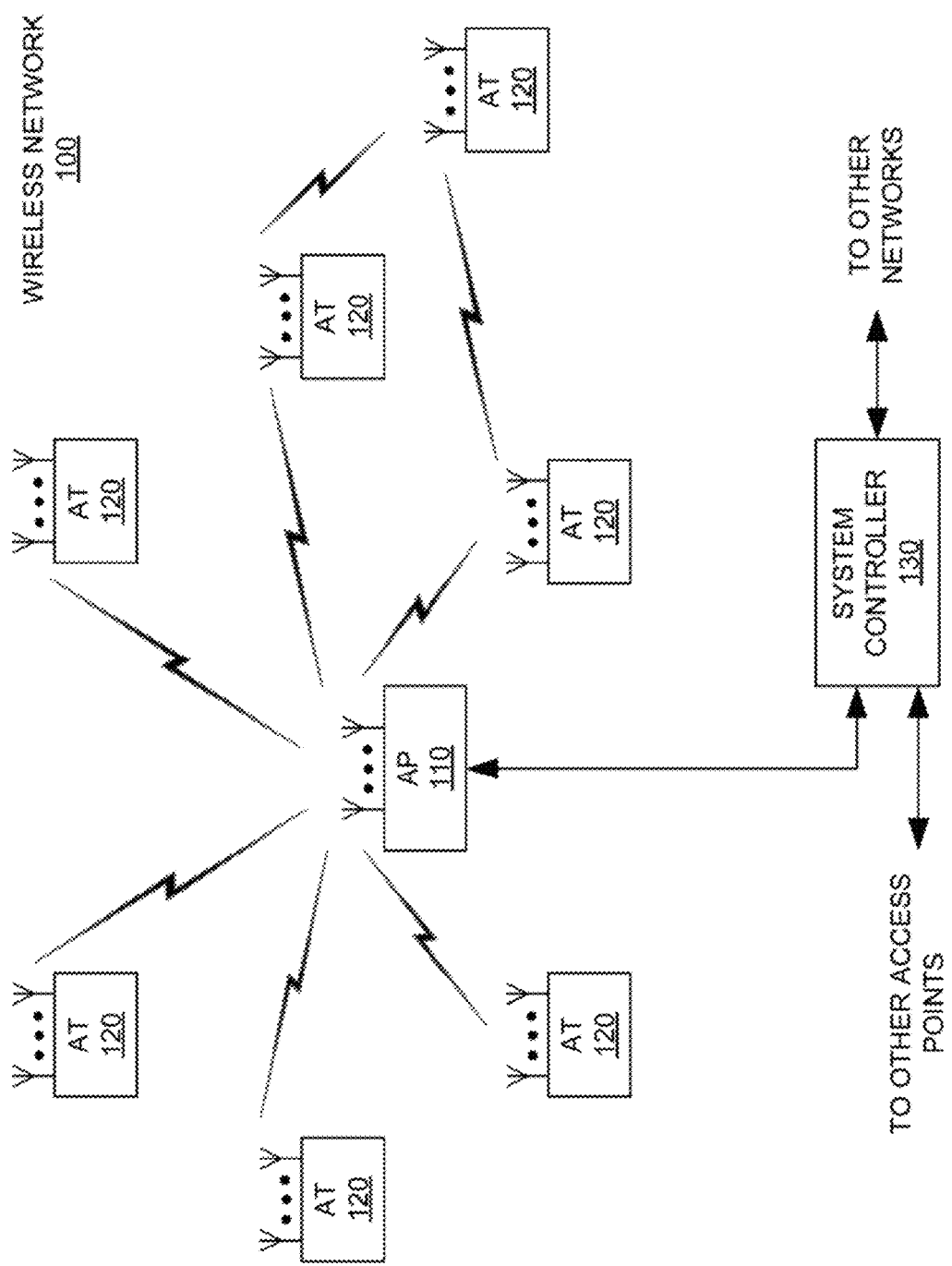
FIG. 1 shows a spatial division multiple access MIMO wireless system in accordance with certain aspects of the present disclosure.

Several aspects of a wireless network will now be presented with reference to FIG. 1. The wireless network, which is also referred to herein as a basic service set (BSS) 100 is shown with several wireless nodes, generally designated as an access point 110 and a plurality of access terminals or stations (STAs) 120. Each wireless node is capable of receiving and/or transmitting. In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, a wireless node, an access terminal acting as an access point, or some other suitable terminology. An access terminal may be referred to as a user terminal, a mobile station, a subscriber station, a station, a wireless device, a terminal, a node, a wireless node or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage. However, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream and then transmitting each spatially preceded stream through a different transmit antenna on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream. It should be noted that although the term "precoding" is used herein, in general, the term "coding" may also be used to encompass the process of precoding, encoding, decoding and/or postcoding a data stream.

One or more access terminals 120 may be equipped with multiple antennas to enable certain functionality. With this configuration, for example, multiple antennas at the access point 110 may be used to communicate with a multiple antenna access point to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

Figure 2:
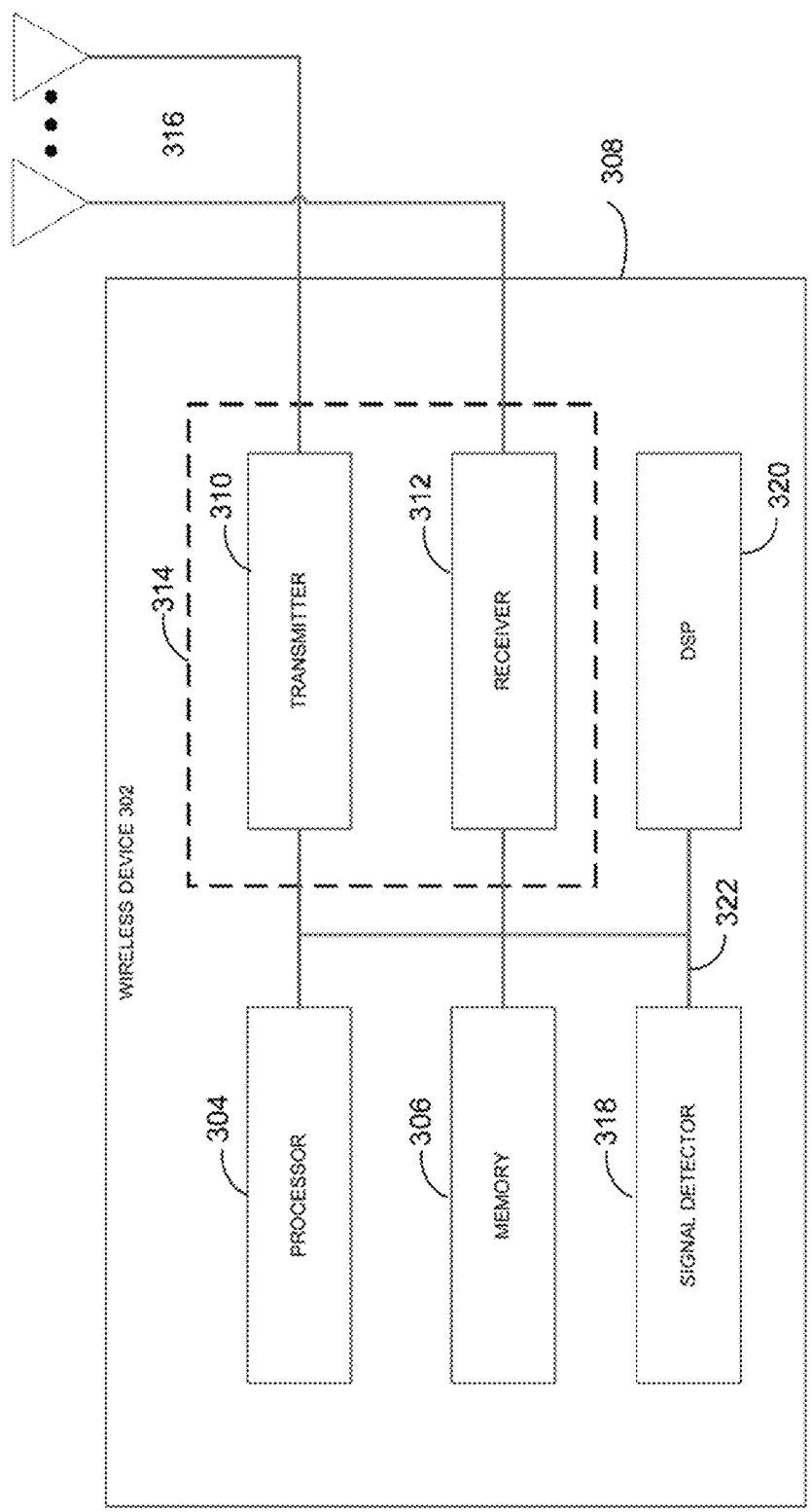
FIG. 2 illustrates example components of a wireless device in accordance with certain aspects of the present disclosure.

FIG. 2 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

As used herein, the term "legacy" generally refers to wireless network nodes that support 802.11 n or earlier versions of the 802.11 standard.

While certain techniques are described herein with reference to SDMA, those skilled in the art will recognize the techniques may be generally applied in systems utilizing any type of multiple access schemes, such as SDMA, OFDMA, CDMA, and combinations thereof.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this disclosure are not limited to any particular wireless technology and/or air interface standard.

Acronyms
A-MPDU . . . Aggregated Media Access Control Protocol Data Unit
AC . . . Access Category
AIFS . . . Arbitration Interframe Space
AP . . . Access Point
BA . . . Block Ack
BAR . . . Block Ack Request
C . . . Control
CF-End . . . Contention Free End
CSI . . . Channel State Information
CTS . . . Clear to Send
CW . . . Contention Window
DA . . . Destination Address
DIFS . . . Distributed Coordination Function Interframe Space
DSC . . . Deterministic Slot Count
EDCA . . . Enhanced Distributed Channel Access
FCS . . . Frame Check Sequence
GST . . . Guaranteed Start Time
L-SIG . . . Legacy Signal field
MAC . . . Media Access Control
MCS . . . Modulation Coding Scheme
MIMO . . . Multiple Input Multiple Output
MU-MIMO . . . Multi-User Multiple Input Multiple Output
NAV . . . Network Allocation Vector
OFDM . . . Orthogonal Frequency Division Modulation
OFDMA . . . Orthogonal Frequency Division Multiple Access
PHY . . . Physical Layer
PIFS . . . Point Coordination Function Interframe Space
SDMA . . . Spatial-Division Multiple Access
SIFS . . . Short Interframe Space
SIG . . . Signal
STA . . . Station TCP . . . Transmission Control Protocol
TDLS . . . Tunneled Direct Link Setup
TXOP . . . Transmit Opportunity
VSL . . . Very Short Slot
WLAN . . . Wireless Local Area Network The references IEEE 902.11-2007 and IEEE 802.11 n-2009 provide additional information and are incorporated by reference herein in their entirety.

A problem in 802.11 Wireless LAN (WLAN) is how to efficiently organize response transmit opportunities (TXOPs) from several receivers. The receivers may have received downlink data in parallel through Spatial-Division Multiple Access (SDMA) or Orthogonal Frequency Division Multiple Access (OFDMA). after which they need to respond with a BA frame, possibly with other uplink traffic. SDMA is also referred to as Multi-User Multiple Input Multiple Output (MU-MIMO). OFDMA is also referred to as multi-user Orthogonal Frequency Division Modulation (OFDM).

Prior solutions to this problem have relied on providing the addressed stations with a specified time slot after the downlink transmission, but this may have potential drawbacks. As an example, the AP does not know the optimal length of the slot, because the uplink PHY rate and the amount of data are unknown. As another example, when the time slot information is not received by the station, then the time slot is wasted. The PHY rate could be specified by the AP, but this would typically result in a too conservative estimate and therefore too long response slots.

A solution for this problem is to provide the addressed receivers with a deterministic backoff, for instance through a Deterministic Slot Count (DSC) field which is embedded in a downlink transmission. Each addressed station is assigned an individual backoff count when the downlink SDMA A-MPDU is sent by the AP. The deterministic slot count is counted down by the addressed receivers after receipt of the downlink transmission containing the DSC field, which results in an array of uplink transmissions separated by AIFS+1 slot when normal EDCA backoff is used. Each station sends its response when its DSC reaches zero. In this way, each station contends for the channel using a conventional contention protocol, but according to the assigned deterministic backoff counts. (By contrast, in conventional contention, a station chooses a backoff count randomly.) In certain aspects EDCA may be modified so that AIFS also counts as a slot, allowing the separation 350 between return frames to be reduced to PIFS as illustrated in FIG. 3.

Figure 3:
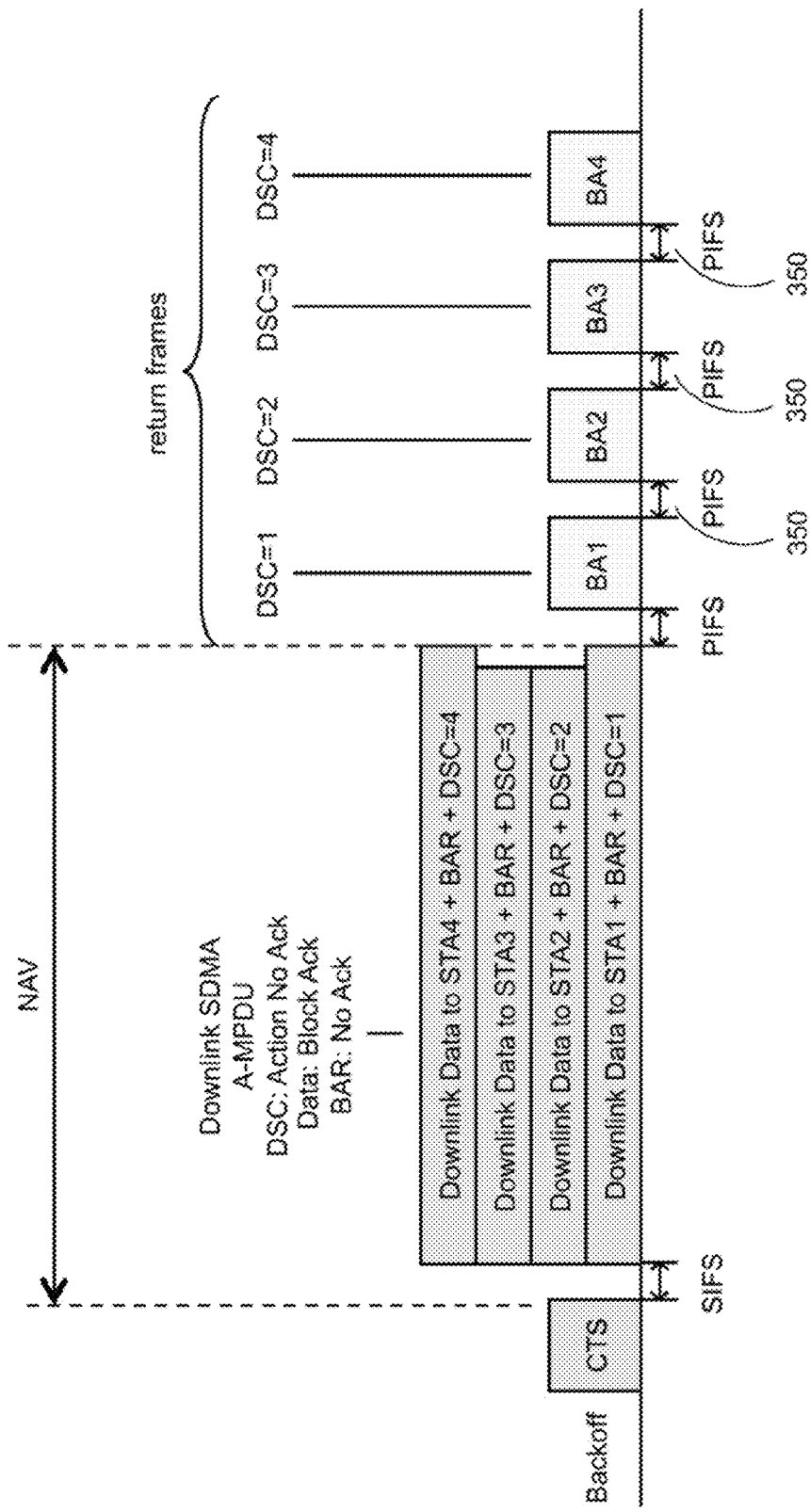
FIG. 3. illustrates a downlink SDMA transmission with return transmit opportunities (TXOPs) through a deterministic backoff with a modified EDCA such that AIFS is counted as a slot.

The frame exchange sequence in FIG. 3 starts with a CTS that sets a NAV for the duration of the longest downlink SDMA TXOP. The downlink SDMA TXOP contains downlink Data for STA1-STA4, including possible Control frames. A BAR frame is included in the A-MPDU to request a Block Ack. The DSC frame (or element) indicates the slot count for the return TXOP. The DSC field may be carried inside a generic control frame (C-frame). The Ack policy on the downlink frames is such that no SIFS response is elicited (the Ack policy on the downlink Data is set to Block Ack, the Ack policy on the BAR is set to No Ack, the Ack policy on the DSC frame is set to No Ack).

Deterministic backoff refers to providing each addressed station a predetermined slot count for the backoff of its return TXOP.

Figure 4:
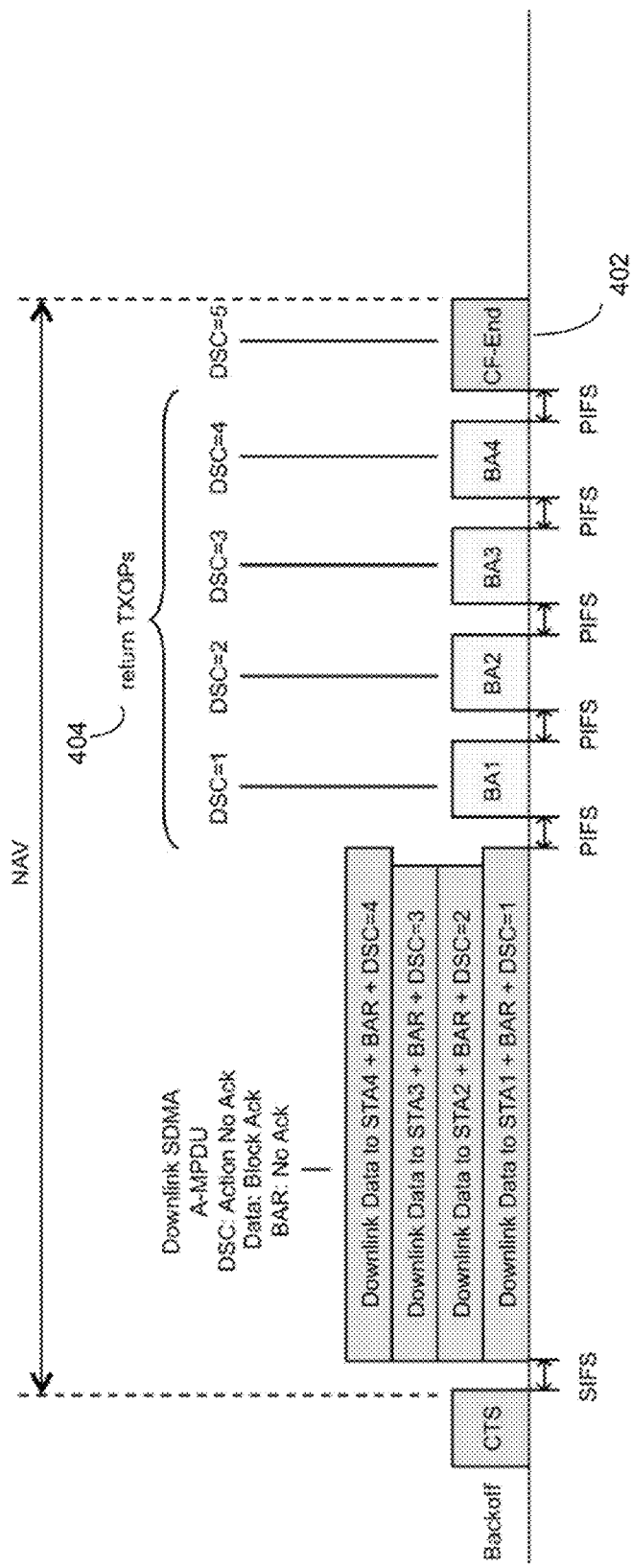
FIG. 4. illustrates a downlink SDMA transmission with return TXOPs through a deterministic backoff where the DSC functions as an implicit CF-End to truncate the NAV.

In certain aspects, the presence of a DSC field may function as an implicit CF-End, which terminates a NAV for the addressed station receiving the DSC field. The NAV may be set by a CTS prior to the SDMA transmission for a duration that significantly exceeds the longest downlink transmission. Truncating the NAV only for the addressed stations (by means of the DSC field) provides the addressed stations with priority access over other contenders (or stations) that were not addressed in the SDMA transmission and that did not receive a DSC field. After the uplink TXOPs, the overall NAV may be truncated through a CF-End frame. As illustrated in FIG. 4, a CF-End frame 402 may be scheduled at the end of the uplink return TXOPs by providing it a deterministic slot count equal to the number of return TXOPs 404 plus one.

The frame exchange sequence in FIG. 4 starts with a CTS which sets a NAV for a duration that exceeds the duration of the downlink SDMA TXOP. The downlink SDMA TXOP contains downlink Data for STA1-STA4, including possible Control frames. The Ack policy on the downlink frames is such that no SIFS response is elicited. The Ack policy on the downlink Data is set to Block Ack. A BAR frame is included to request for a Block Ack. The Ack policy on the BAR is set to No Ack. The DSC frame (or element) indicates the slot count for the return TXOP. The Ack policy on the DSC frame is set to No Ack. The DSC truncates the NAV for the addressed STA. The DSC may include a minimum duration of the NAV, so that the backoff starts after the longest SDMA transmission.

Figure 5:
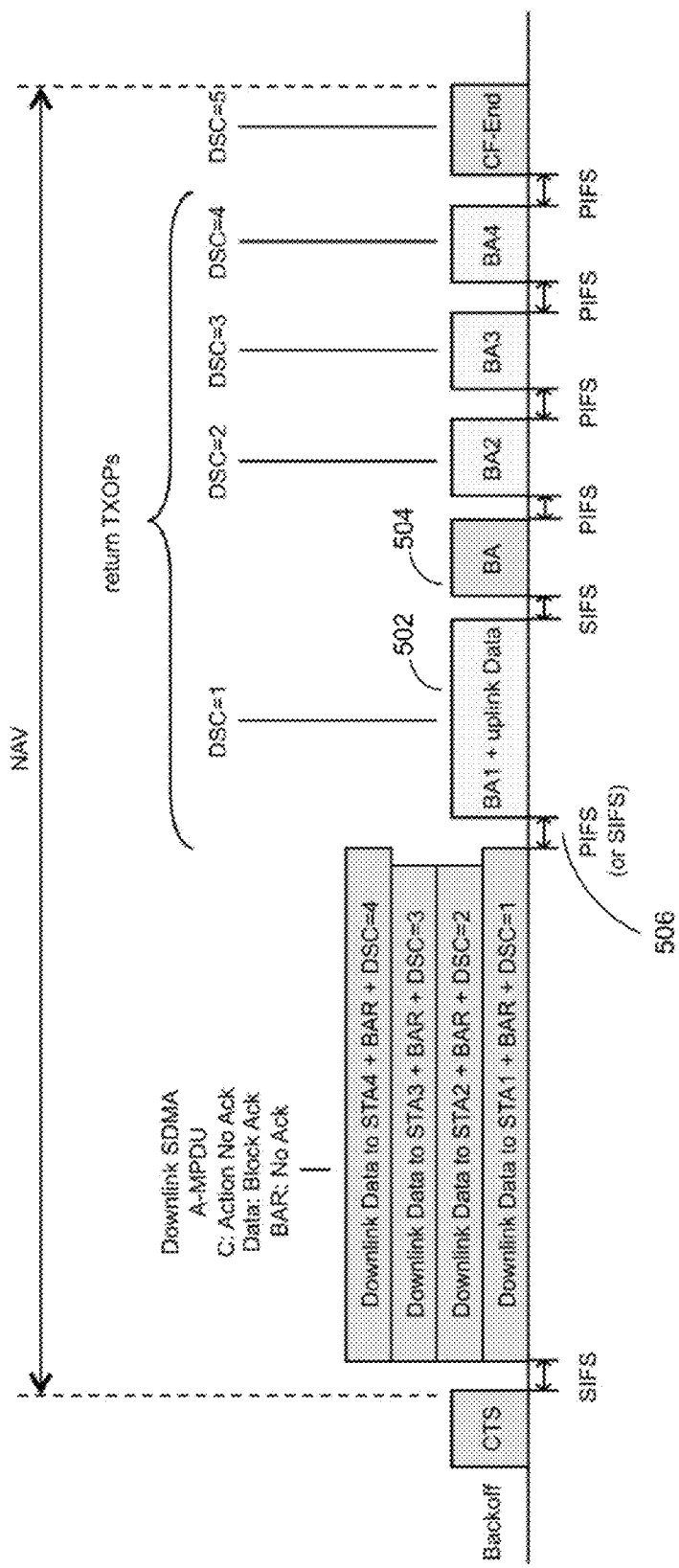
FIG. 5 illustrates a downlink SDMA transmission with return TXOPs through a deterministic backoff where the return TXOP may include Data multi-protocol data units (MPDUs), to which the AP may respond with a Block Ack.

In certain aspects, the uplink TXOPs do not need to be limited to response traffic only. Uplink Data may be included, for instance in the form of an A-MPDU 502, as illustrated in FIG. 5. The AP may transmit immediate feedback, such as a Block Ack 504, SIFS after the uplink A-MPDUI.

The sequence starts with a CTS that sets a NAV for a duration that exceeds the duration of the downlink SDMA TXOP. The downlink SDMA TXOP contains an A-MPDU containing downlink Data for STA1-STA4 and Control frames such as BAR and DSC. The Ack policy on the downlink frames is such that no SIFS response is elicited. The Ack policy on the downlink Data is set to Block Ack. A BAR frame is included to request for a Block Ack. The Ack policy on the BAR is set to No Ack. The DSC frame (or element) indicates the slot count for the return TXOP. The Ack policy on the DSC frame is set to No Ack. The DSC truncates the NAV for the addressed STA. The DSC may include a minimum duration of the NAV, so that the backoff starts after the longest SDMA transmission. STA1 receives a deterministic slot count of 1 slot, which it counts down during the first PIFS 506 occurring after the downlink SDMA transmission. STA1 transmits an A-MPDU 502 which contains a BA frame and uplink Data MPDUs. The uplink Data MPDUs may use the Implicit BAR Ack Policy. The AP responds SIFS after the uplink A-MPDU with the requested BA frame. STA2 then sends its response frame(s) PIFS after the downlink BA frame 504. STA3 then sends its response frame(s) PIFS after the STA2 response frame(s). Then STA4 sends its response frame(s) after the STA3 response frame(s).

Figure 6:
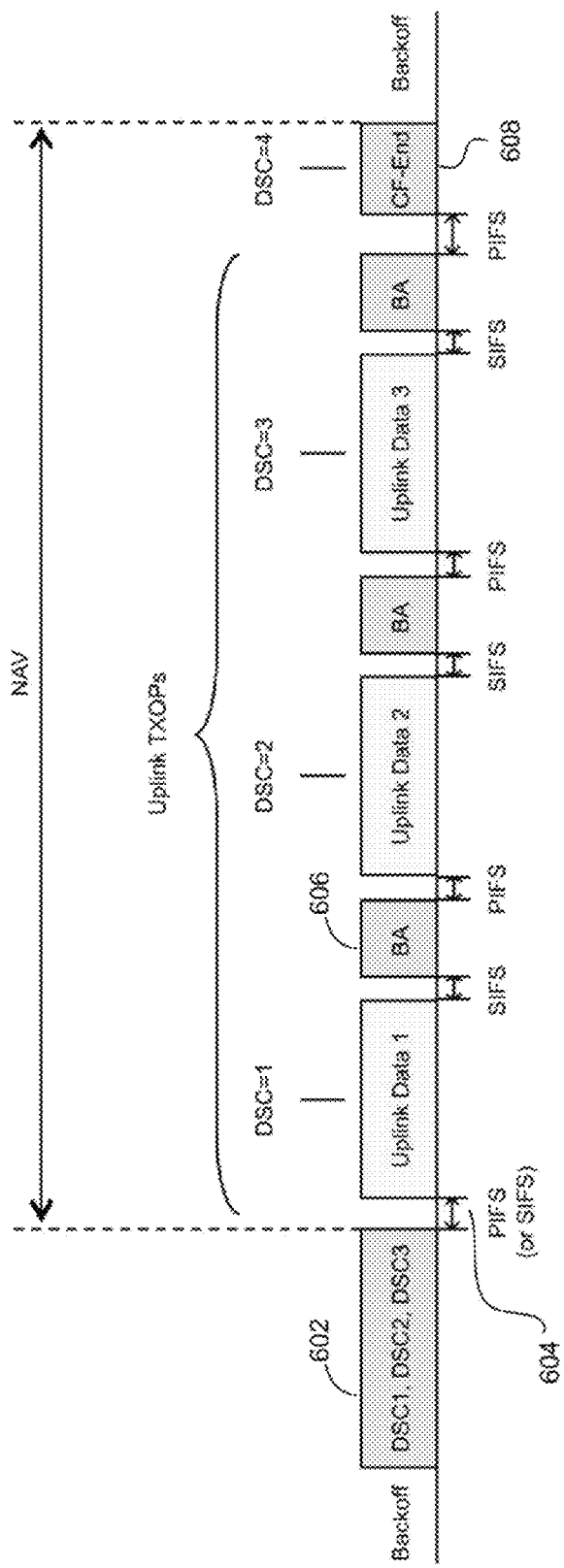
FIG. 6 illustrates a downlink SDMA exchange with deterministic backoff for return TXOPs.

In certain aspects return TXOPs through deterministic backoff may also be indicated through a non-SDMA frame 602 as illustrated in FIG. 6.

The downlink SIGMA exchange sequence with deterministic backoff for return TXOPs starts with a DSC frame 602 that sets a long NAV. The DSC frame indicates a deterministic backoff for STA1-STA3. The DSC implicitly truncates the NAV for STA1-STA3 (or no NAV is set because the frame setting the NAV is a DSC frame). After a first empty backoff slot 604, STA1 transmits an uplink A-MPDU containing at least one Data MPDU. The Data MPDU has the implicit BAR Ack policy. The AP responds with a BA frame 606 SIFS after the end of the uplink transmission. A similar transmission pattern occurs for STA2 and STA3 as illustrated in FIG. 6. Finally, the AP responds with a CF-End frame 608 PIFS after the BA frame for STA3. This terminates the NAV for other stations not recipients of the DSC frame.

Return TXOPs through deterministic backoff may be made even more efficient when the SIFS time is reduced. This is possible without backwards compatibility issues when the return TXOP phase is not mixed with regular contention by setting a NAV that is truncated only for the addressed recipients of the DSC frame. Setting a NAV and selectively truncating it at a subset of the devices creates a situation in which only the selected subset of devices will perceive medium idle conditions during which a backoff can be counted down, while other devices will refrain from counting down their backoff because the virtual carrier sense (NAV) indicates that the medium is busy.

The AP may transmit DSC frames autonomously to streamline the contention process. When the AP observes that contention exceeds a certain threshold, it may start transmitting DSC frames to reduce the contention and improve the channel access efficiency. An exemplary threshold is 10% collision rate as experienced by the AP. The AP may use priority access to transmit DSC frames, but the AP must ensure that it periodically inserts enough empty backoff slots such that new nodes or nodes that are not included in the DSCs may access the channel too.

Deterministic Slot Count (DSC)

Deterministic slot count (DSC) generally refers to providing STAs with a deterministic slot count for a backoff that precedes a response TXOP by a STA. The response TXOP 702 can be used to transmit Control and/or Data frames (uplink or direct link), as illustrated in FIG. 7.

Figure 7:
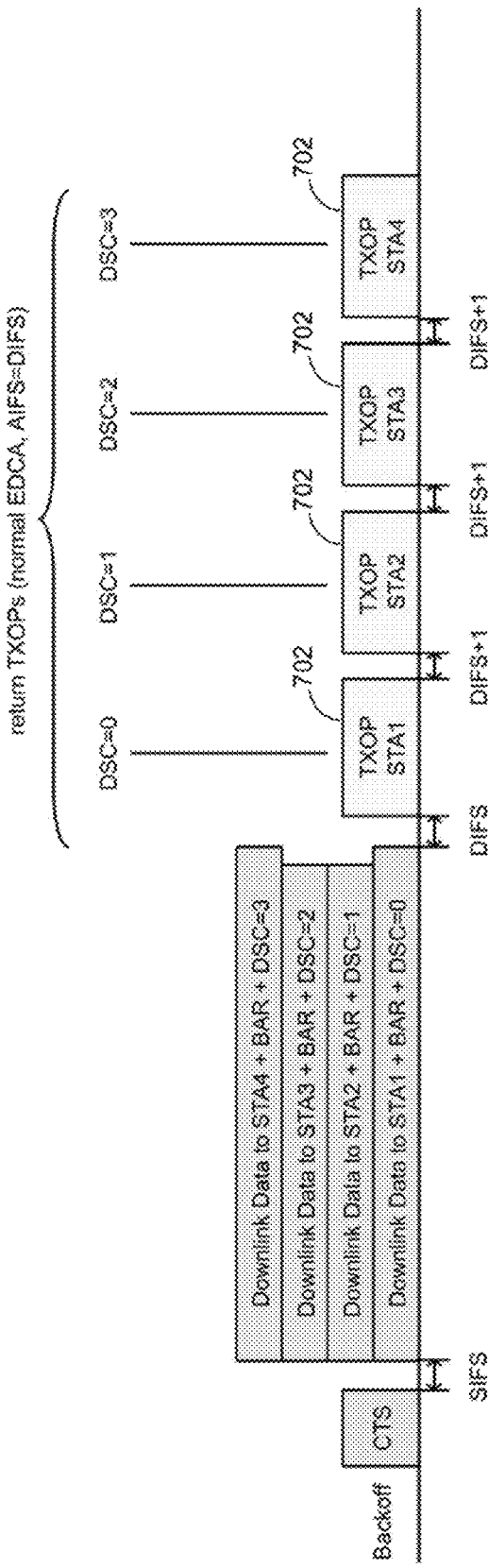
FIG. 7 illustrates a deterministic backoff using FOCA and AIFS equal to DIFS.

In certain aspects, as shown in FIG. 7, EDCA may be used with an AIFS equal to DIFS. STA1, which received a DSC of 0, will access the medium DIFS after the end of the downlink transmission containing the DSC. STA2, which received a DSC of 1, will access the medium DIFS+1 slot after the end of the TXOP started by STA1. STA3, which received a DSC of 2, will access the medium DIFS+1 slot after the TXOP started by STA2, etc. The difference in gap size for the first and later TXOPs is caused by the fact that AIFS is not counted as a backoff slot in regular EDCA. So only a backoff of 0 slots will result in a DIFS gap (or AIFS in general), any non-0 backoff will result in a gap of at least DIFS+1 slot (or AIFS+1 slot in general).

Figure 8:
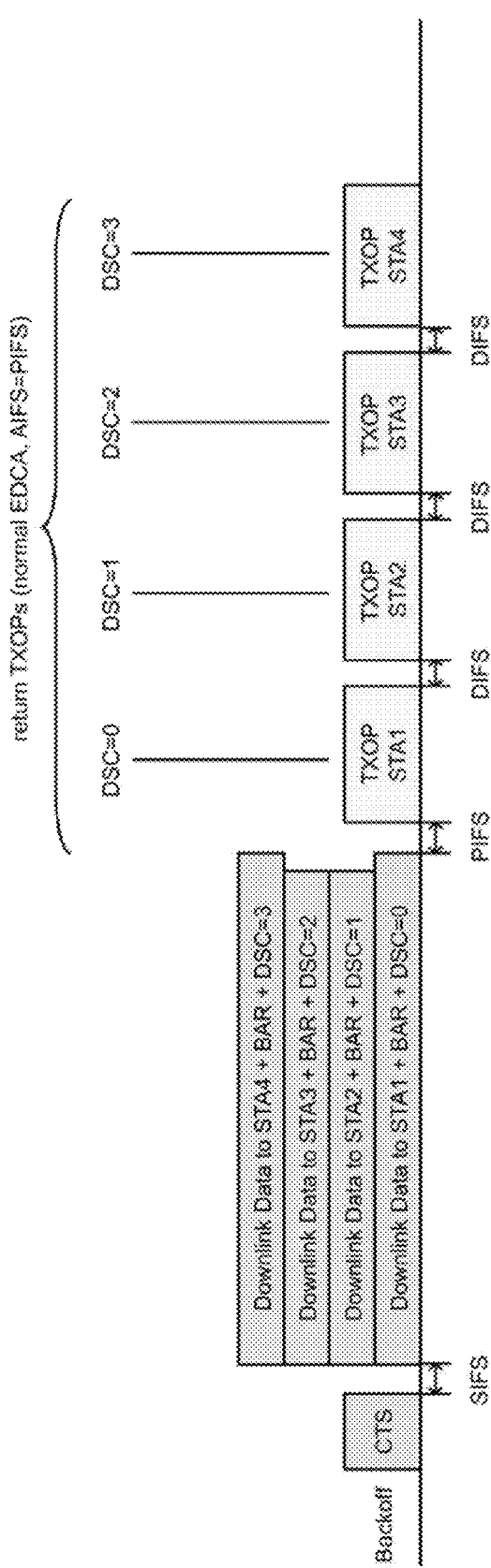
FIG. 8 illustrates a deterministic backoff using EDCA and AIFS equal to PIFS.

In certain aspects, as illustrated in FIG. 8, the gaps between return TXOPs can be reduced by 1 slot by setting AIFS equal to PIFS.

Figure 9:
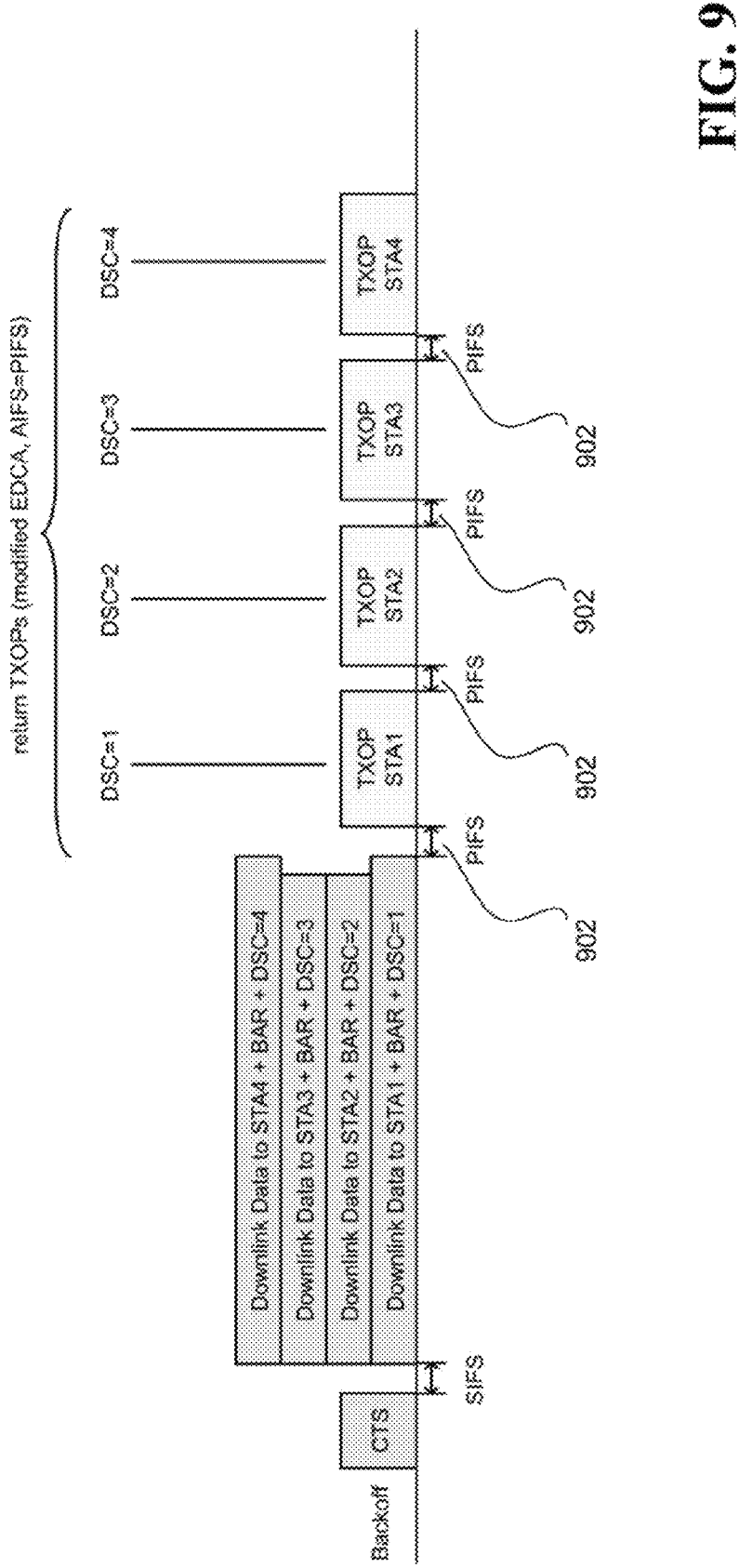
FIG. 9 illustrates a deterministic backoff using modified EDCA and AIFS equal to PIFS.

In order to have all gaps 902 the same duration, EDCA may be modified so that AIFS is counted as a backoff slot. This is illustrated in FIG. 9 for AIFS=PIFS. A backoff of 0 is no longer a valid backoff in this case, so the smallest DSC is 1.

Figure 10:
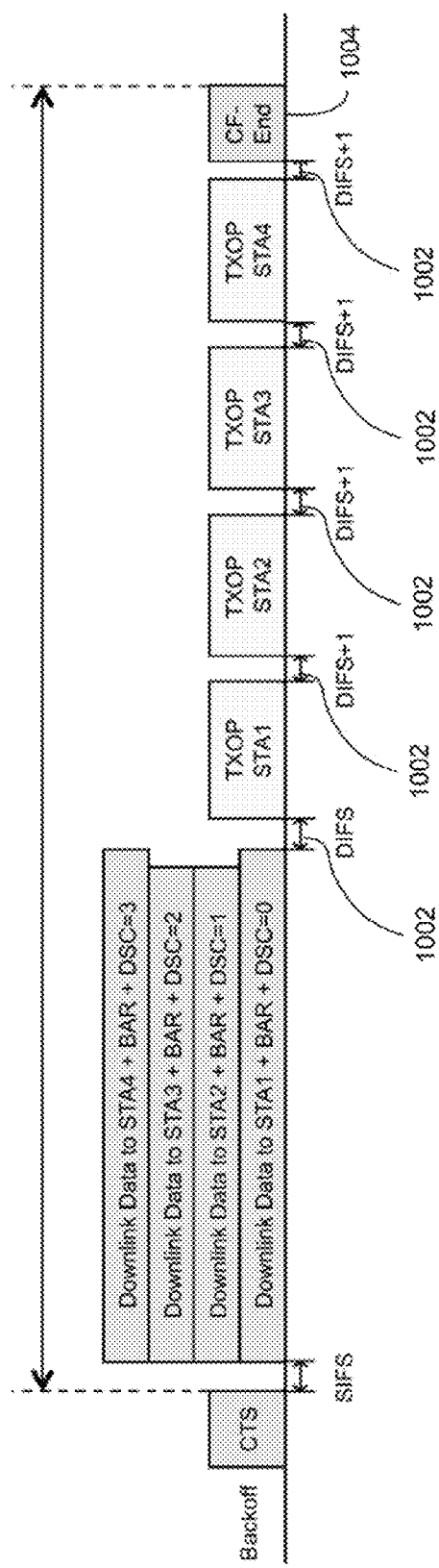
FIG. 10 illustrates a deterministic backoff with NAV protection.

PIFS gaps between the uplink TXOPs allow for priority access to the medium, so that NAV is not required to avoid collisions with other contenders which have to wait a longer period of time before accessing the medium. When the gaps 1002 are larger than PIFS, then a NAV is required, as illustrated in FIG. 10. The presence of a DSC field implicitly resets a NAV at the receiver of the field. The overall NAV is reset by a CF-End frame 1004 that is transmitted by the AP. The CF-End frame is scheduled for transmission at one slot after the longest DSC, so the CF-End has a DSC of 4 in this example.

Figure 11:
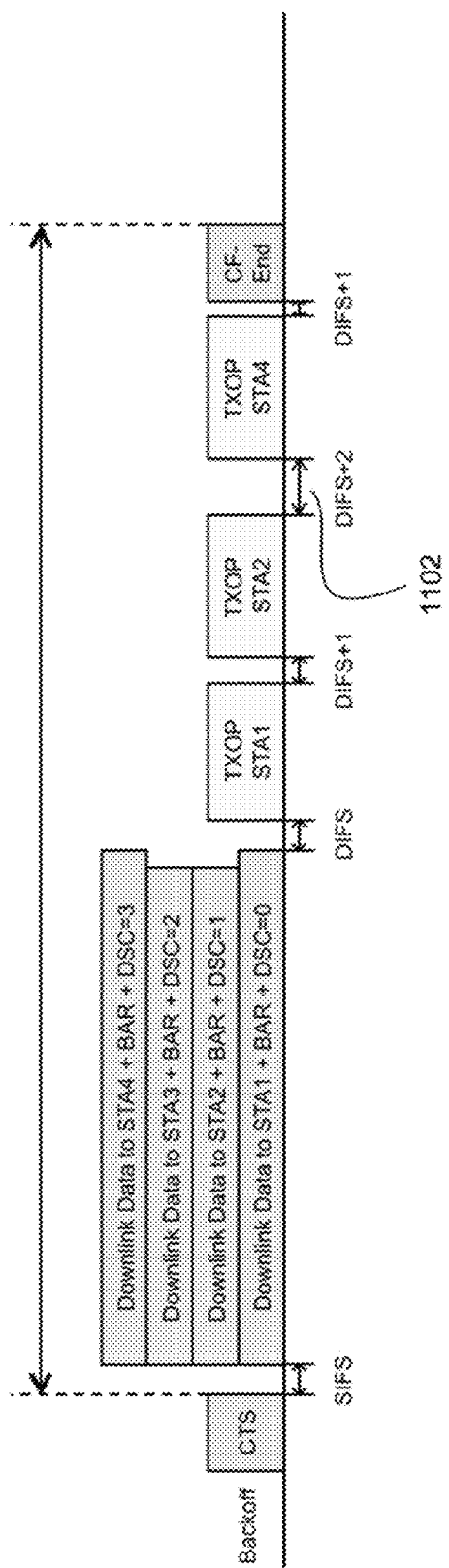
FIG. 11 illustrates a gap with one extra empty slot between the TXOP of STA2 and the TXOP of STA4, caused by STA3 not receiving its DSC.

When a TXOP does not occur because the STA did not receive the DSC or due to some other reason, there will be an additional empty slot as a result. This is illustrated in FIG. 11, where the gap 1102 between TXOP STA2 and TXOP STA4 has an additional empty slot.

To stay close to the EDCA model of traffic scheduling, the DSC could apply to a specific Access Category (AC), which could be the same as the AC of the downlink traffic or it could be the AC that would win the internal contention should the medium remain idle. Control traffic such as BA should be added to the return TXOPs.

To avoid that other internal queues (i.e., Access Categories) have a TXOP before the DSC AC does, the AIFS of the DSC AC may be assigned an AIFS equal to PIFS during the DSC backoff. When the DSC backoff expires, the AIFS is reset to the original value and contention follows the EDCA rules with the CW that was present before the DSC backoff.

When the AIFS of the DSC AC is set to PIFS, then the DSC ACs have priority on the medium and over the internal ACs (assuming that only APs use an AIFS that is equal to PIFS). This means that no CF-End is needed, but that the AP needs to correct the backoffs for internal ACs with AIFS=PIFS. The backoff for these ACs must be increased by the maximum DSC that is being handed out (in the above examples, the backoff(s) need to be incremented by 3). Correcting the internal backoffs avoids that the AP ACs interfere with DSC TXOPs from the STAs. If STAs also use AIFS equal to PIFS then they need to increment those backoffs also. To this end, the highest DSC needs to be included in the DSC frame (next to the actual DSC that is being handed out to the STA).

The fact that the AP had a successful TXOP indicates that there is no backoff equal to 0 in the system. Because if there is, then it would have caused a collision, but since there was no collision, there can be no backoff equal to 0 in the system. Therefore, none of the PIFS/DIFS gaps will cause a pending backoff to be decremented (assuming the AP is the only system in the network that uses PIFS).

This all works out well, unless another AP uses PIFS AIFS on the same channel. In that case, NAV with selective reset and a CF-End will have to be used as described above. However, the AP still has to add the maximum DSC to its own ACs that use PIFS AIFS, because the AP internally does not set a NAV as the transmitter of the CTS frame.

When the return traffic is restricted to only a BA frame (or to one PHY Protocol Data Unit (PPDU) in general), then the deterministic slot count (DSC) can be interpreted to refer to the BA slot i at which the STA may transmit its BA. The STA counts the number of frames after the end of the downlink SDMA transmission and after i leading frames (i.e., frames from prior STAs) it sends its BA frame. This is illustrated in FIG. 12.

The interval 1202 between the uplink BA frames can be as short as SIFS in this case, or even shorter as permitted by the agreed-upon Rx-to-Tx turnaround time at the STAs. The index i may be derived implicitly from the order at which the device identifier occurs in the downlink SDMA transmission. Setting a NAV is not needed, because no gaps will occur that are long enough for other devices to count down a backoff.

Figure 12:
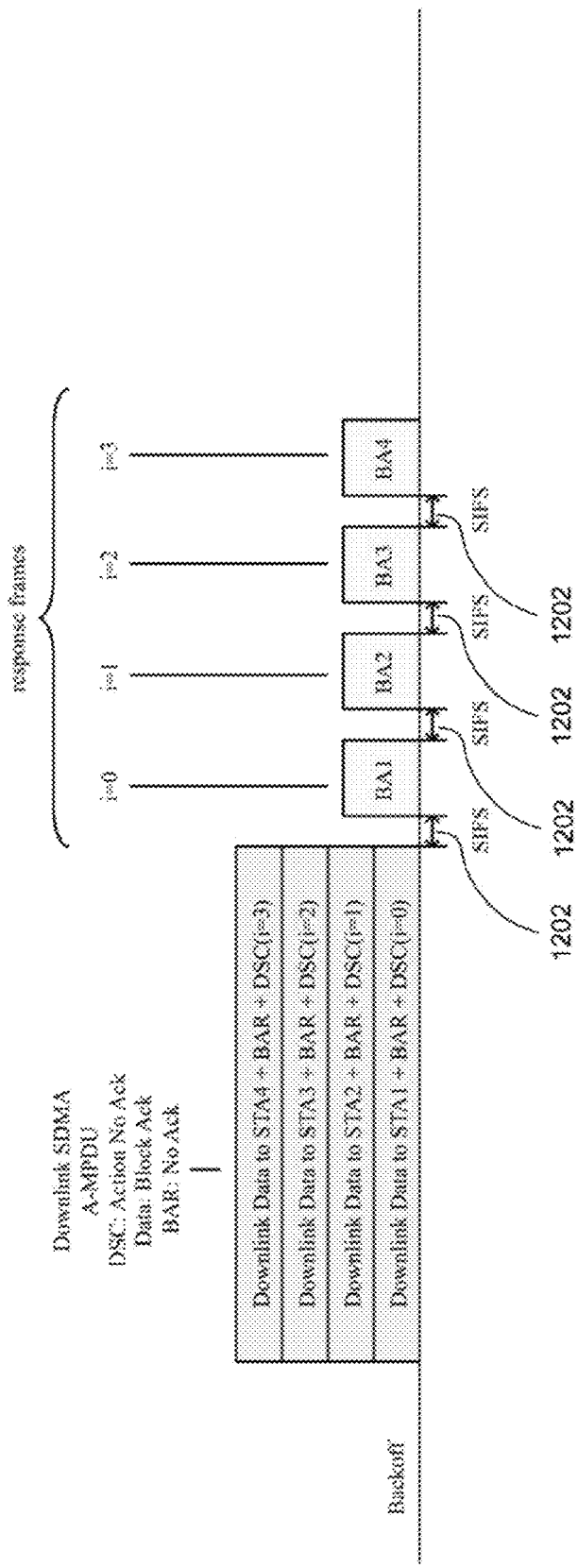
FIG. 12 illustrates a downlink SDMA transmission with slotted uplink BAs.

The frame exchange sequence, as illustrated in FIG. 12, may start with a CTS (not shown) that may set a NAV for the duration of the longest downlink SDMA TXOP. Setting a NAV is not strictly necessary because the duration of the downlink transmissions is advertised in the PHY header of the downlink SDMA transmission, and no gaps may occur during the entire sequence. The downlink SDMA TXOP may contain downlink data for STA1 through STA4, including possible Control frames. A BAR frame may be included in the A-MPDU, to request for a Block Ack (BA) frame to be returned after the SDMA transmission. The DSC frame (or element) indicates to each STA the slot count for transmitting the BA. The Ack policy on the downlink frames is such that no SIFS response is elicited, possibly with the exception of downlink frames that are sent to the STA that is intended to transmit the first BA. The Ack policy on the downlink Data MPDUs may be set to Block Ack, the Ack policy on the BAR MPDU may be set to No Ack, the Ack policy on the DSC frame may be set to No Ack.

One or more STAs may not receive one or more leading transmissions, or a leading transmission may not be present at all, for instance when the STA that should have sent it did not receive the DSC. To recover from such an event, in certain aspects, the AP may provide to each STA a time at which the transmission of the BA may begin, irrespective of the number of prior frames received by the STA. The receipt of a frame in this context may be defined as the correct receipt of a Legacy SIGNAL (L-SIG) field. The receipt of a frame in this context may be defined as the correct receipt of a PHY header. This time may be referred to as a guaranteed start time (GST). The guaranteed start time may also be derived at the STAs based on the assigned DSC in combination with a known maximum duration of the BA frames. The maximum duration may be included as part of the DSC information, or it may have been distributed by the AP through other means.

Figure 13:
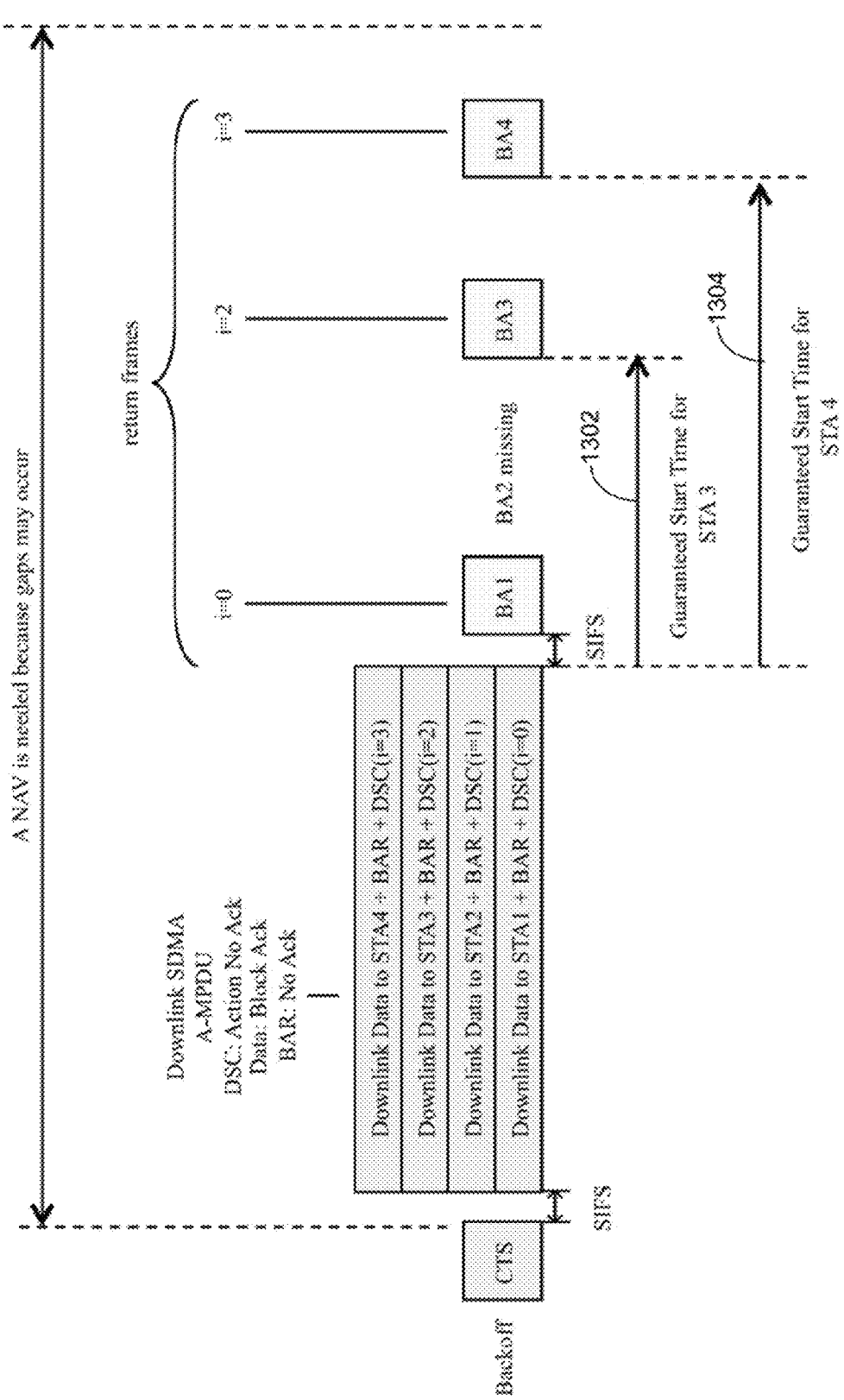
FIG. 13 illustrates the use of a guaranteed start time to ensure that the trailing STAs will recover when a leading frame is not received.
Figure 14:
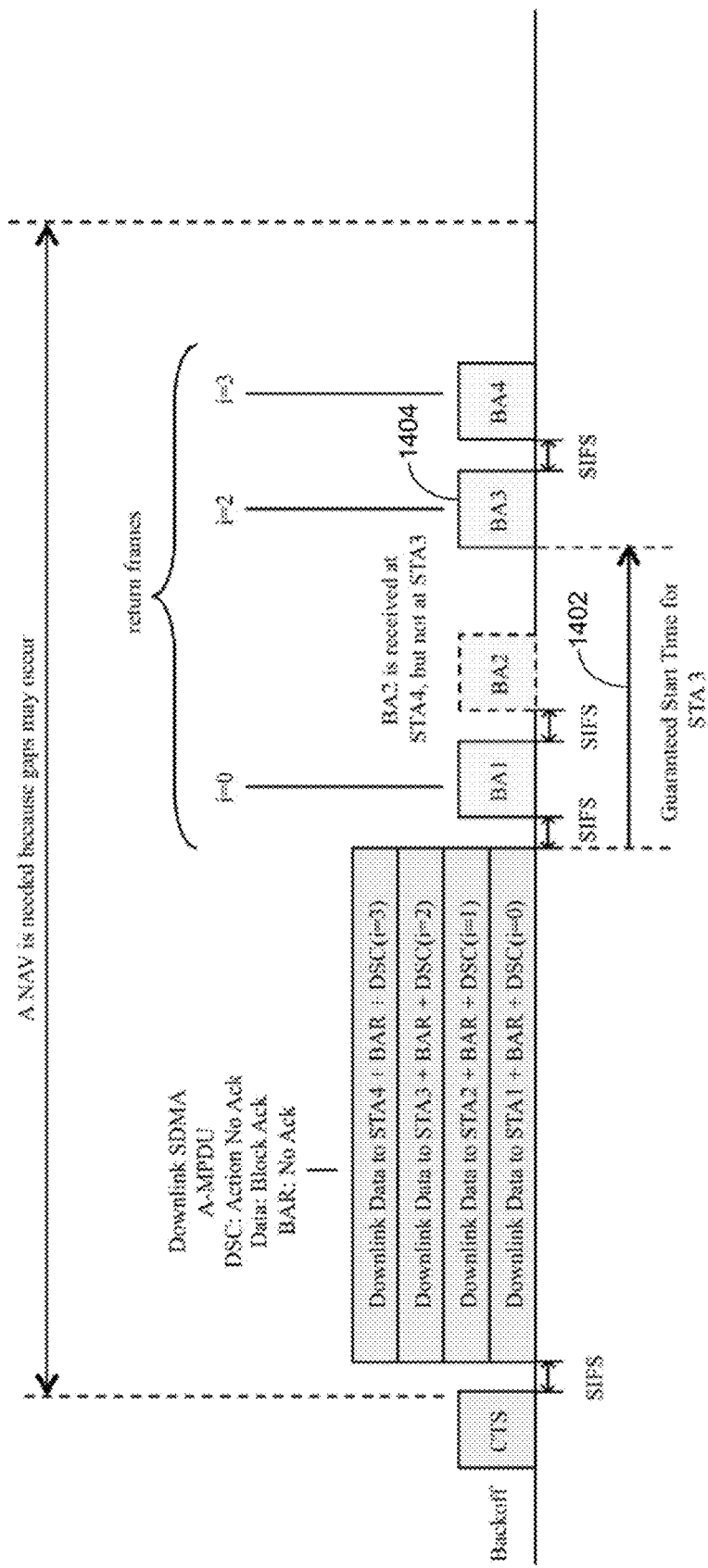
FIG. 14. illustrates a situation where only a subset of STAs that did not receive all of the leading transmissions will transmit at their guaranteed start time, in this case STA3.

A STA that did not receive one or more leading frames will transmit its BA at its guaranteed start time 1302, 1304, as shown in FIG. 13. If a leading frame is not received by only a subset of the addressed STAs, then only the addressed STAs in that subset will transmit at their guaranteed start time 1402, while other addressed STAs (which did receive all of the leading frames) will transmit SIFS after their leading frame. This is illustrated in FIG. 14, where STA3 did not receive the frame from STA2 (BA2), but STA4 did receive it. Hence, STA3 transmits at its guaranteed start time, while STA4 transmits SIFS after the transmission 1404 from STA3 (BA3).

Figure 15:
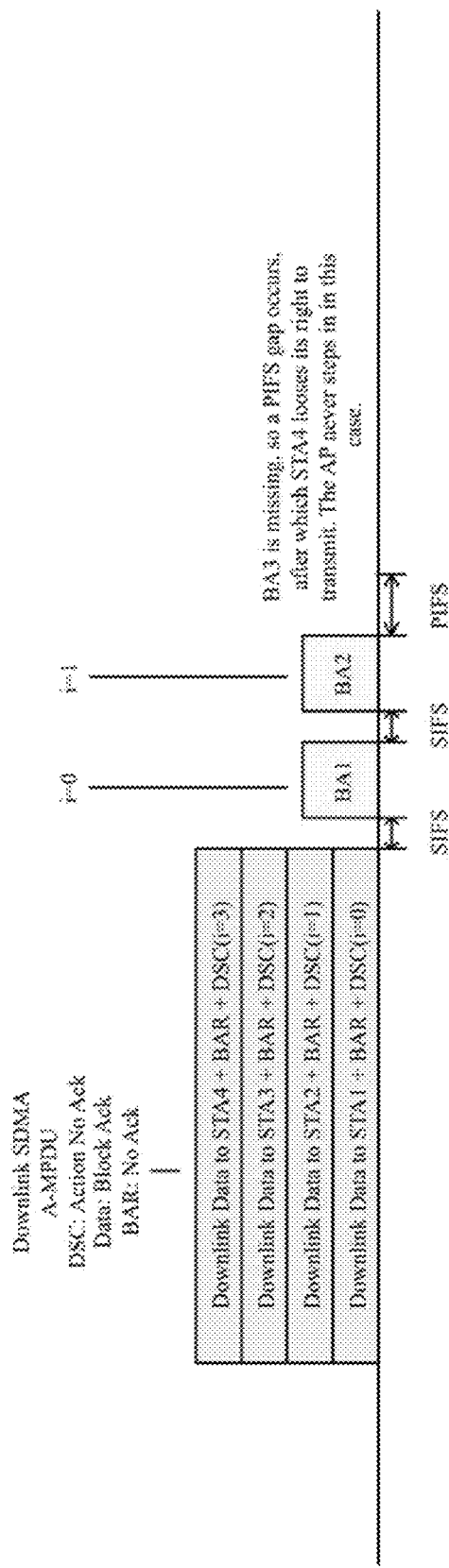
FIG. 15 illustrates a situation of the TXOP chain breaking when there is no fallback mechanism in the case of a missing frame resulting in subsequent STAs losing their right to transmit when a gap larger than PIFS occurs in the TXOP transmission chain.

Alternatively, in certain aspects, there could be no fallback mechanism in case of a missing frame, combined with a rule that subsequent STAs lose their right to transmit when a gap occurs that is larger than PIFS (PIFS is equal to a SIFS duration plus a slot time). This is illustrated in FIG. 15, where BA3 is missing causing a gap after which STA4 loses its right to transmit.

In certain aspects, when a gap occurs, the AP may send a BAR frame to the STAs in the chain that did not respond, or the AP may continue sending downlink traffic and expect the missing STAs to transmit their BA in a subsequent BA chain. To increase the probability that a STA transmits its BA, the AP may modify the order of the STAs in the chain.

Figure 16:
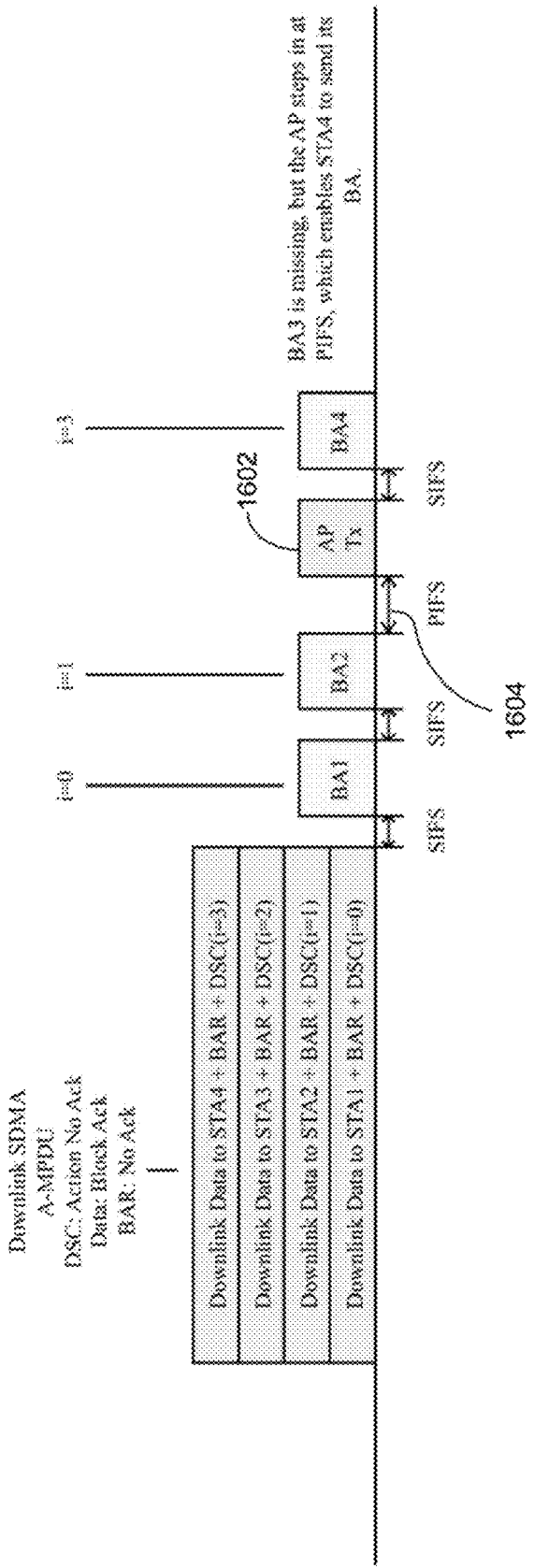
FIG. 16 illustrates the AP stepping in at PIFS to avoid breaking the TXOP transmission chain.

Alternatively, in certain aspects, the AP may step in with a short transmission 1602 when a gap 1604 occurs that is equal to PIFS, to avoid the chain from breaking, as illustrated in FIG. 16.

The short transmission 1602 could be an ACK frame addressed at the AP. Subsequent STAs in the chain will still transmit in this case. A rule may be added that STAs lose their right to transmit when a gap equal to DIFS occurs.

Each of the mentioned intervals could be different intervals. For instance, the SIFS interval could be a shorter interval, because STAs in the sequence may start the Rx to Tx turnaround during the data portion of the preceding frame (or at any time after receiving a valid signal field of a preceding PHY header).

Figure 17:
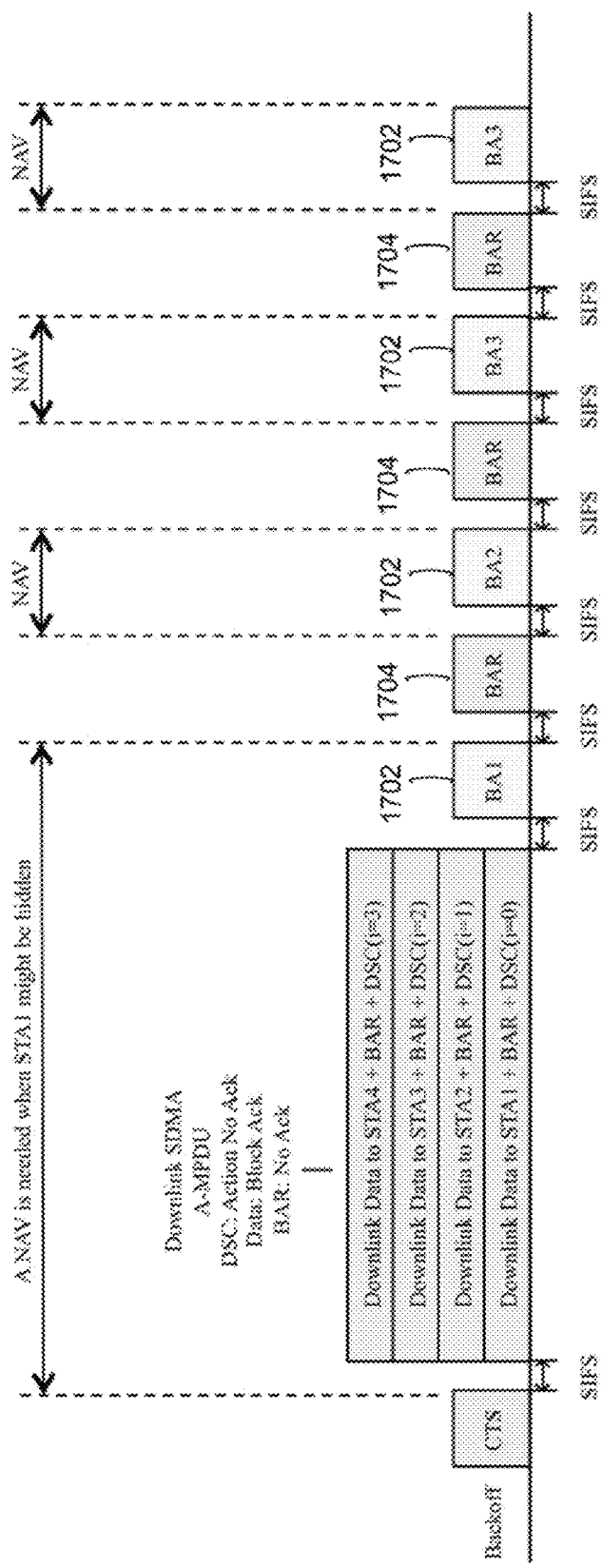
FIG. 17 shows an exemplary illustration of polling for BA.

For illustrative purposes, FIG. 17 illustrates a polled scenario, in which each BA frame 1702 is solicited by the AP by sending a BAR 1704 frame.

Figure 18:
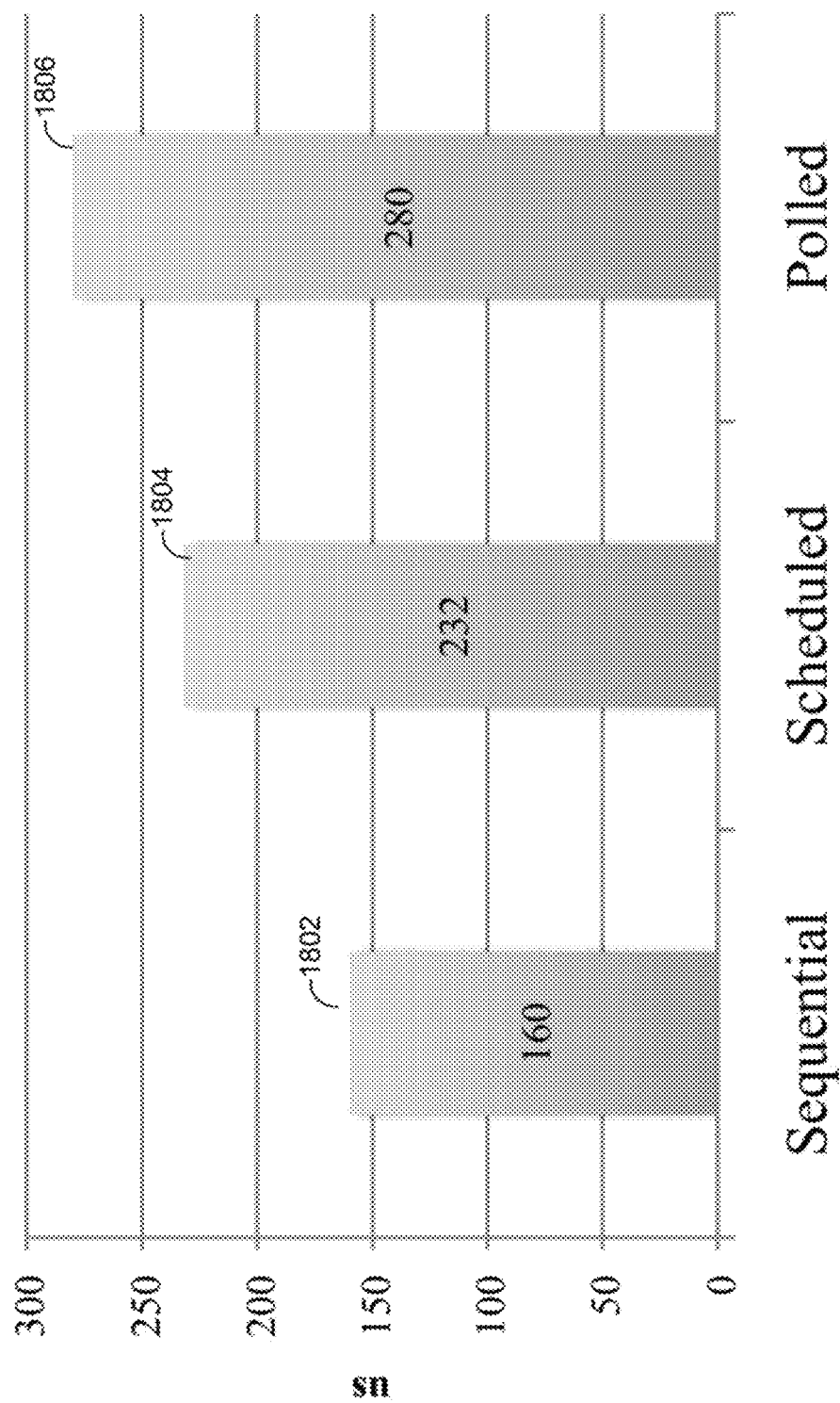
FIG. 18 provides a comparison between Sequential ACK, Scheduled ACK and Polled ACK for 4 BAs at 65 Mbps.

A comparison between Sequential ACK 1802, Scheduled ACK 1804 and Polled ACK 1806 is shown in FIG. 18. With Polled ACK, the AP polls for each BA frame individually by sending a BAR frame. This method has the highest overhead as shown in FIG. 18. With Scheduled ACK, the AP schedules fixed time slots during which the response frames can be transmitted. As shown in FIG. 18, the overhead of Scheduled ACK is lower than that of Polled ACK, but still higher than Sequential ACK.

The difference in overhead between Sequential ACK and Scheduled ACK will increase when data can be aggregated to the BA frames, using A-MPDU. To avoid that the response frames become too long, a length limit may be imposed on the response A-MPDU. The length limit could be expressed in terms of bits, or time. In particular, it may be interesting to aggregate TCP Ack frames to the response frame.

The AP may transmit a response frame in response to the received response A-MPDU. In this case, STAs must count double the number of frames prior to their slot (2×i).

Figure 19:
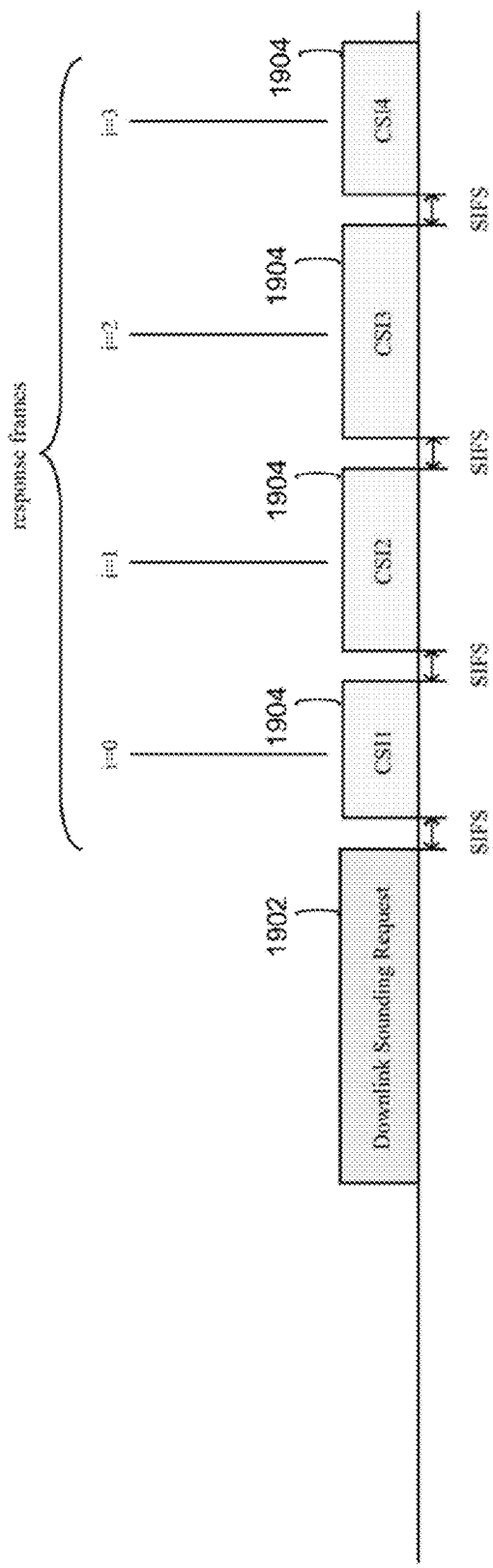
FIG. 19 illustrates a sounding request followed by sequential CSI frames.

Sequential ACK can be used in a variety of protocols where a single downlink transmission by an AP is responded to by transmissions from several STAs. For example, referring to FIG. 19, the downlink transmission by the AP might be a sounding request frame 1902. The uplink response frames may be sounding response frames 1904. These response frames may contain channel state information (CSI) information.

Figure 20:
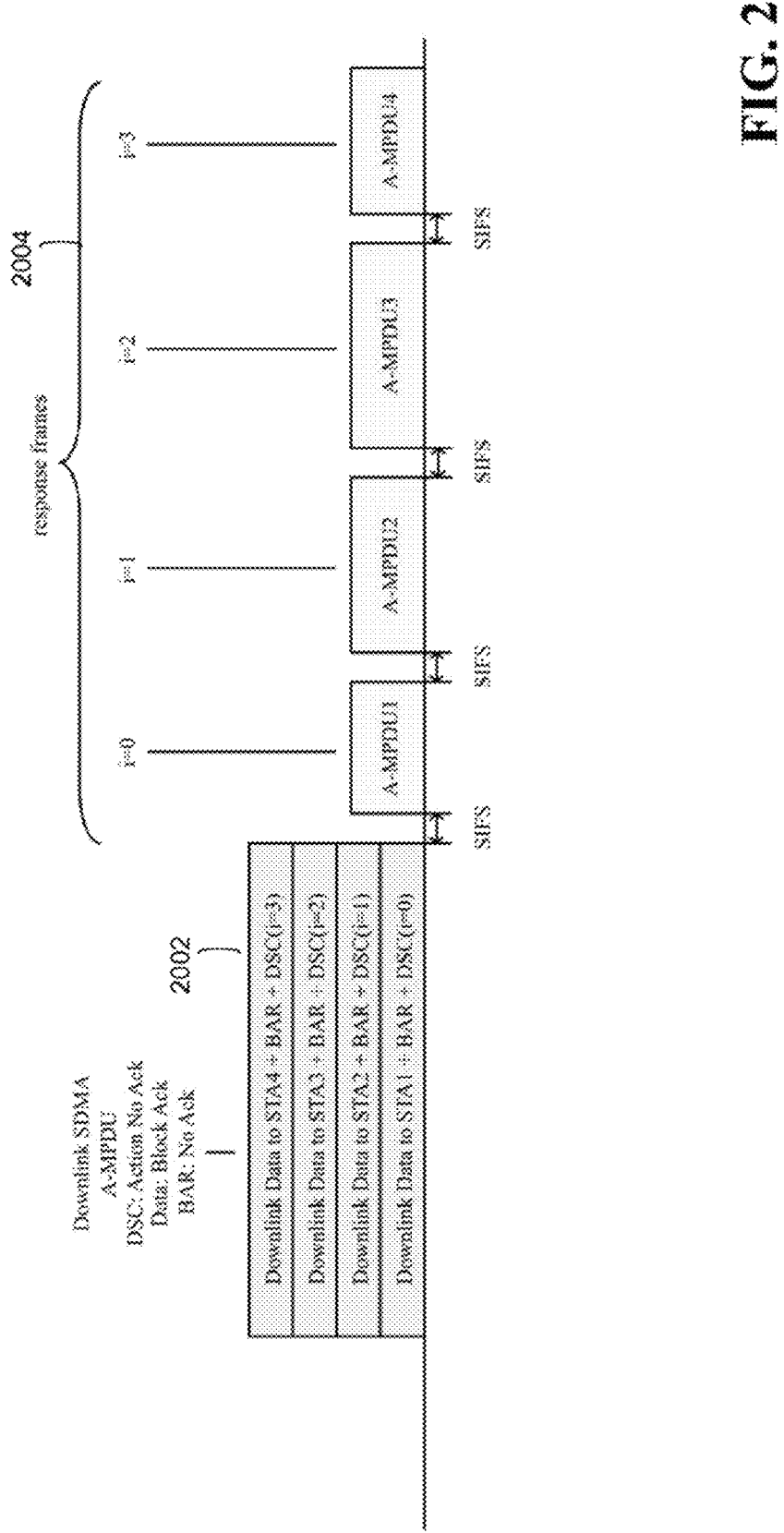
FIG. 20 illustrates a broadcast or parallel transmission may be followed by several response A-MPDUs, in a sequential manner.

In general, sequential ACK can be used in cases where one transmission 2002 (broadcast or parallel) is followed by several response transmissions 2004 from different STAs. This is illustrated in FIG. 20.

Figure 21:
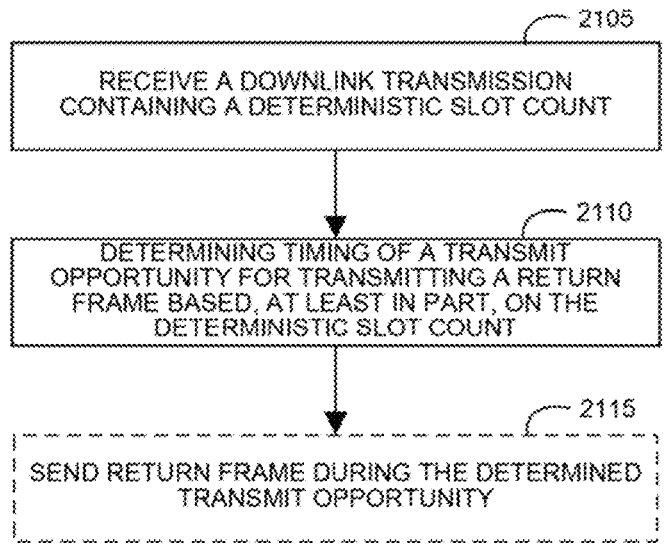
FIG. 21 illustrates example operations for receiving a downlink transmission with a deterministic slot count, in accordance with certain aspects of the present disclosure.

FIG. 21 illustrates example operations for receiving a downlink transmission from an AP that may include a deterministic backoff for return transmissions in accordance with certain aspects of the present disclosure. The operations may be performed, for example, by one of multiple stations receiving downlink transmissions (e.g., via SDMA) from an AP.

The operations begin, at 2105, by receiving a downlink transmission containing a deterministic slot count. At 2110, timing of a transmit opportunity for transmitting a return frame is determined based, at least in part, on the deterministic slot count. Optionally (as indicated by dashed lines in FIG. 21), at 2115, a return frame may be transmitted in the determined transmit opportunity.

Figure 22:
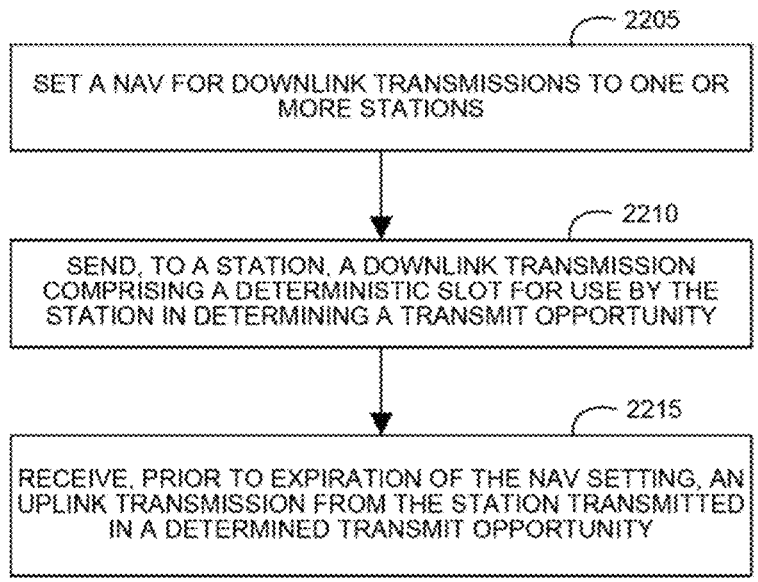
FIG. 22 illustrates example operations for transmitting a downlink transmission with a deterministic slot count, in accordance with certain aspects of the present disclosure.

FIG. 22 illustrates example operations for sending a downlink transmission from an AP that may include a deterministic backoff for return transmissions in accordance with certain aspects of the present disclosure. The operations may be performed, for example, by an AP sending downlink transmissions (e.g., via SDMA) to multiple stations.

The operations begin, at 2205, by setting a NAV for downlink transmissions to one or more stations. At 2210, a downlink transmission is sent to a station, the downlink transmission comprising a deterministic slot for use by the station in determining a transmit opportunity. At 2115, an uplink transmission may be received from the station, the uplink transmission transmitted in a determined transmit opportunity prior to expiration of the NAV setting.

Figure 23:
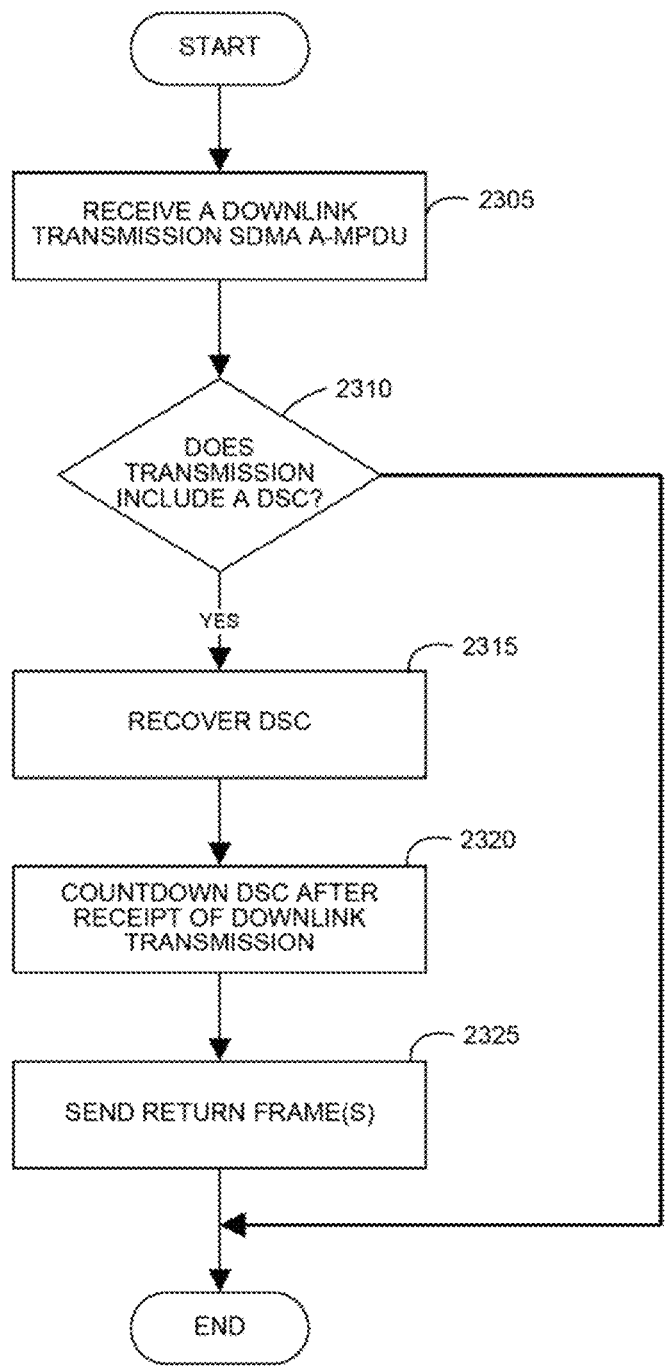
FIG. 23 illustrates a method according to an aspect for receiving downlink transmissions that may include a deterministic slot count.

FIG. 23 illustrates an example method of receiving downlink transmissions from an AP that may include a deterministic backoff for return transmissions in accordance with certain aspects of the present invention. In operation 2305, a station receives a downlink SDMA A-MPDU containing information addressed to the station. Then operation 2310 is performed. Operation 2310 determines if the received SDMA A-MPDU includes a DSC field containing a deterministic slot count to be used by the station for its TXOP.

If operation 2310 determines that the downlink transmission does not include a deterministic slot count, the method ends. If operation 2310 determines that there is a deterministic slot count contained in the downlink transmission, then operation 2315 is executed to recover the deterministic slot count to be used by the station. Then operation 2320 is executed. In operation 2320, the station counts down the deterministic slot count once the downlink transmission has been received. Then operation 2325 is executed. In operation 2325, the station sends its return frame(s) in response to the downlink transmission. In certain aspects the return frame(s) may be a BA frame. In other aspects, the return frame(s) may be an A-MPDU including a BA and uplink data. The method then exits.

Figure 24:
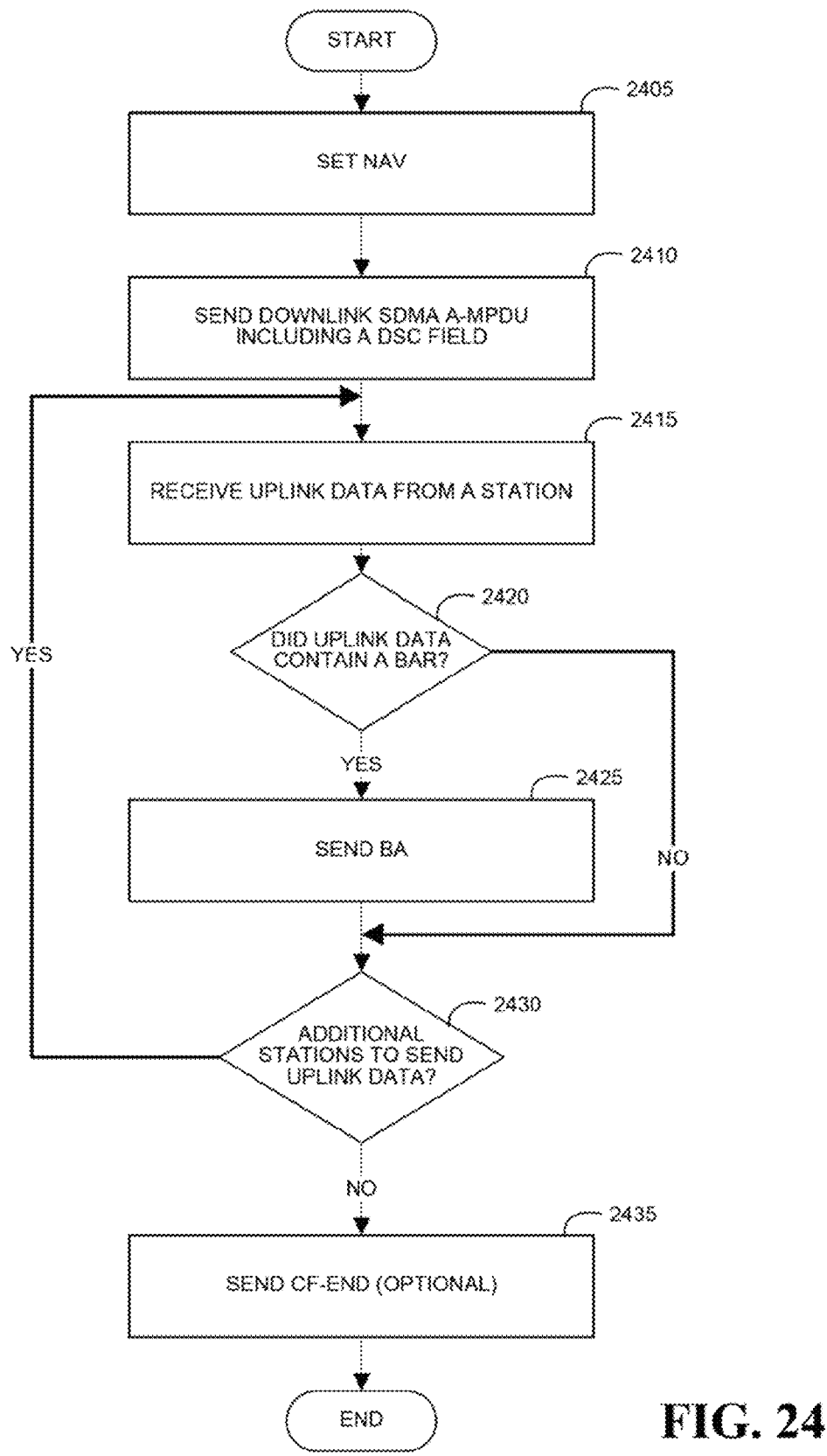
FIG. 24 illustrates a method according to an aspect for implementing a deterministic channel backoff.

FIG. 24 illustrates an example method for deterministic backoff channel access that may be used for downlink transmissions in accordance with certain aspects of the present invention. At operation 2405, the AP sets a NAV for the longest downlink SDMA TXOP. The downlink SDMA TXOP may contain downlink data for several stations. In certain aspects the NAV may be sent as part of a CTS frame while in other aspects the NAV may be sent in a non-SDMA frame such as a DSC frame.

After operation 2405, operation 2410 is performed. In operation 2410 a downlink transmission such as an SDMA A-MPDU including a DSC field is sent. Then operation 2415 is performed. In operation 2415 uplink data from one of the addressed stations is received. Then operation 2420 is performed. In operation 2420, the uplink frame is checked to determine if a BAR is included in the transmission. If operation 2420 determines that a BAR is included in the transmission, then operation 2425 is performed. Otherwise operation 2430 is performed.

In operation 2425 a BA is sent. Then operation 2430 is performed. In operation 2430 it is determined if there are additional stations that need to send uplink data. If there is an additional station that needs to send uplink data, then operation 2415 is performed. If operation 2430 determines that no additional stations need to send uplink data, then operation 2435 is performed.

In operation 2435, an optional CF-End frame may be sent. Then the method exits.

DSC with Power Saving

To save power, STAs listening to the medium may switch off their receiver for the duration indicated in the PHY header, when no MAC portion can be received (because the MCS is not supported by the STA) or the when DA does not match the STA MAC address. The latter may also occur when a reception error occurs. A reception error cannot be verified because the FCS will not be received, but this does not matter because a faulty and therefore different MAC address would not have lead to a successful reception.

Figure 21A:
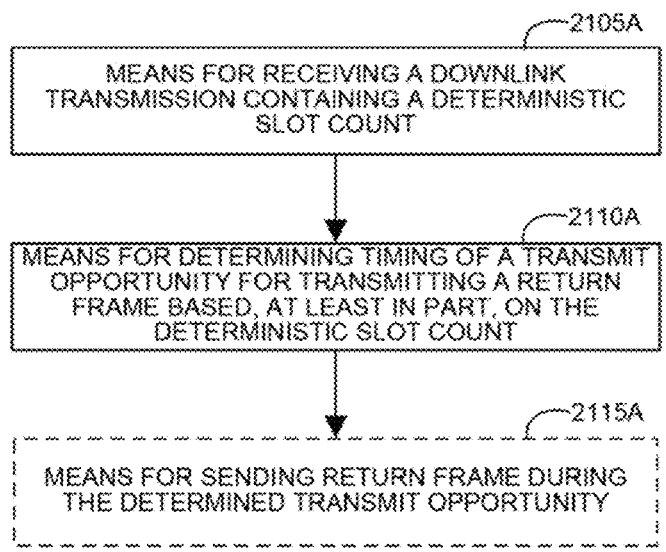
Figure 22A:
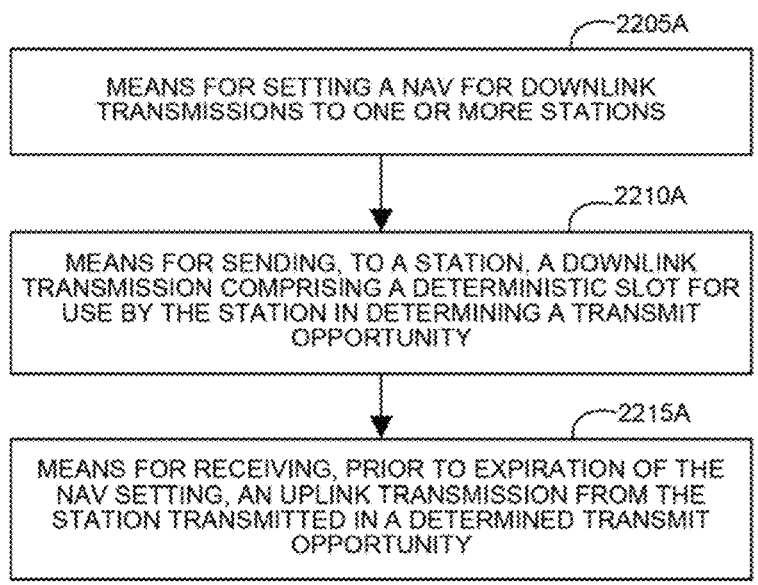

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations illustrated in FIGS. 21 and 22 correspond to components illustrated in FIGS. 21A and 22A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logic blocks, modules and circuits described in connection with the present disclosure may be implemented or performed with a general purpose processor, a digital signal processor (DSP), an application specific integrated circuit (ASIC), a field programmable gate array signal (FPGA) or other programmable means device (PLD), discrete gate or transistor means, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The steps disclosed in the example algorithms may be interchanged in their order without departing from the scope and spirit of the present disclosure. Also, the steps illustrated in the example algorithms are not exclusive and other steps may be included or one or more of the steps in the example algorithms may be deleted without affecting the scope and spirit of the present disclosure.

The methods disclosed herein comprise one or more steps or actions for achieving the described method. The method steps and/or actions may be interchanged with one another without departing from the scope and spirit of the present disclosure. The method steps and/or actions are not exclusive and other method steps and/or actions may be included or one or more method steps and/or actions may be deleted without affecting the scope and spirit of the present disclosure. In other words, unless a specific order of steps or actions is specified, the order and/or use of specific steps and/or actions may be modified without departing from the scope and spirit of the disclosure.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

While various aspects of the present disclosure have been described herein, each with one or more technical features, those skilled in the art will appreciate that different technical features of the various aspects described herein may also be combined resulting in various combinations not explicitly described herein. Further, certain aspects may involve multiple technical features, one or more of which may be omitted, again resulting in various combinations of one or more technical features not explicitly described herein.

As an example, while certain aspects may provide a method (and corresponding apparatus) for wireless communications generally including receiving a downlink transmission containing a deterministic slot count and determining timing of a transmit opportunity for transmitting a return frame based, at least in part, on the deterministic slot count, exactly how the receiving and determining is performed may vary according to different aspects. As another example, while certain aspects may provide a method (and corresponding apparatus) for wireless communications generally including setting a NAV for downlink transmissions to one or more stations, sending, to a station, a downlink transmission comprising a deterministic slot for use by the station in determining a transmit opportunity, and receiving, prior to expiration of the NAV setting, an uplink transmission from the station transmitted in a determined transmit opportunity, exactly how the setting, sending, and receiving are performed may vary according to different aspects.

It is to be understood that the claims are not limited to the precise configuration and components illustrated above. Various modifications, changes and variations may be made in the arrangement, operation and details of the methods and apparatus described above without departing from the scope and spirit of the present disclosure.

What is claimed is:

1. A method for wireless communications by an addressed station receiving downlink transmissions, the method comprising:
   receiving a downlink transmission containing a deterministic slot count for an addressed station, the deterministic slot count indicating a backoff period, from a next transmit opportunity, for the addressed station to wait to transmit a response frame to the downlink transmission, wherein the addressed station has priority over at least one contender in a network, and wherein the at least one contender receives no downlink transmission containing the deterministic slot count;
   determining, at the addressed station, timing of the next transmit opportunity for transmitting the response frame based, at least in part, on the deterministic slot count received in the downlink transmission;
   receiving, at the addressed station, a guaranteed start time, the guaranteed start time measured from an end time of the downlink transmission; and
   determining the next transmit opportunity for transmitting the response frame based on the guaranteed start time, rather than the deterministic slot count, in response to a condition.

2. The method of claim 1, further comprising:
   transmitting the response frame during the next transmit opportunity.

3. The method of claim 1, wherein the determining timing of the next transmit opportunity comprises:
   counting down a backoff counter initiated by the deterministic slot count after receipt of the downlink transmission.

4. The method of claim 1, wherein the determining timing of the next transmit opportunity comprises:
   counting down a number of received frames equal to the deterministic slot count after receipt of the downlink transmission.

5. The method of claim 1, wherein the downlink transmission is received via spatial division multiple access (SDMA).

6. The method of claim 1, wherein the downlink transmission further comprises a plurality of deterministic slot counts for a corresponding plurality of stations.

7. The method of claim 1, further comprising receiving a CF-end frame.

8. A method for wireless communications, comprising:
   setting a network allocation vector (NAV) communication period for downlink transmissions to one or more stations;
   sending, to an addressed station, a downlink transmission comprising a deterministic slot count for use by the addressed station in determining a next transmit opportunity and a guaranteed start time, the deterministic slot count indicating a backoff period, from the next transmit opportunity, for the addressed station to wait to transmit a response to the downlink transmission, wherein the addressed station has priority over at least one contender in a network, and wherein the at least one contender receives no downlink transmission containing the deterministic slot count, the guaranteed start time measured from an end time of the downlink transmission; and
   receiving, prior to expiration of the NAV communication period, an uplink transmission from the addressed station transmitted in the next transmit opportunity, the next transmit opportunity determined one of based on, at least in part, the deterministic slot count or based on the guaranteed start time, rather than the deterministic slot count, in response to a condition.

9. The method of claim 8, wherein the uplink transmission is received in the next transmit opportunity determined based on the deterministic slot count.

10. The method of claim 8, wherein the downlink transmission is sent simultaneously with other downlink transmissions via spatial division multiple access (SDMA).

11. The method of claim 8, wherein the downlink transmission further comprises a plurality of deterministic slot counts for a corresponding plurality of stations.

12. The method of claim 8, further comprising:
    sending a CF-End frame indicating an end of the NAV communication period.

13. An apparatus for wireless communications, comprising:
    means for receiving a downlink transmission containing a deterministic slot count for an addressed station, the deterministic slot count indicating a backoff period, from a next transmit opportunity, for the addressed station to wait to transmit a response frame to the downlink transmission, wherein the addressed station has priority over at least one contender in a network, and wherein the at least one contender receives no downlink transmission containing the deterministic slot count;
    means for determining, at the addressed station, timing of the next transmit opportunity for transmitting the response frame based, at least in part, on the deterministic slot count received in the downlink transmission;

means for receiving, at the addressed station, a guaranteed start time, the guaranteed start time measured from an end time of the downlink transmission; and means for determining the next transmit opportunity for transmitting the response frame based on the guaranteed start time, rather than the deterministic slot count.

14. The apparatus of claim 13, further comprising:
means for transmitting the response frame during the next transmit opportunity.

15. The apparatus of claim 13, wherein the means for determining timing of the next transmit opportunity comprises:
means for counting down by the deterministic slot count after receipt of the downlink transmission.

16. The apparatus of claim 13, wherein the means for determining timing of the next transmit opportunity comprises:
means for counting down a number of received frames equal to the deterministic slot count after receipt of the downlink transmission.

17. The apparatus of claim 13, wherein the downlink transmission is received via spatial division multiple access (SDMA).

18. The apparatus of claim 13, wherein the downlink transmission comprises a plurality of deterministic slot counts for a corresponding plurality of stations.

19. The apparatus of claim 13, further comprising means for receiving a CF-end frame.

20. An apparatus for wireless communications, comprising:
means for setting a network allocation vector (NAV) communication period for downlink transmissions to one or more stations;
means for sending, to an addressed station, a downlink transmission comprising a deterministic slot count for use by the addressed station in determining a next transmit opportunity and a guaranteed start time, the deterministic slot count indicating a backoff period, from the next transmit opportunity, for the addressed station to wait to transmit a response to the downlink transmission, wherein the addressed station has priority over at least one contender in a network, and wherein the at least one contender receives no downlink transmission containing the deterministic slot count, the guaranteed start time measured from an end time of the downlink transmission; and
means for receiving, prior to expiration of the NAV communication period, an uplink transmission from the addressed station transmitted in the next transmit opportunity, the next transmit opportunity determined one of based on, at least in part, the deterministic slot count or based on the guaranteed start time, rather than the deterministic slot count, in response to a condition.

21. The apparatus of claim 20, wherein the uplink transmission is received in the next transmit opportunity that was determined based on the deterministic slot count.

22. The apparatus of claim 20, wherein the downlink transmission is sent simultaneously with other downlink transmissions via spatial division multiple access (SDMA).

23. The apparatus of claim 20, wherein the downlink transmission comprises a plurality of deterministic slot counts for a corresponding plurality of stations.

24. The apparatus of claim 20, further comprising:
means for sending a CF-End frame indicating an end of the NAV communication period.

25. An apparatus for wireless communications, comprising:
a memory; and
at least one processor coupled to the memory, the processor configured to
receive a downlink transmission containing a deterministic slot count, the deterministic slot count indicating a backoff period, from a next transmit opportunity, for an addressed station to wait to transmit a response frame to the downlink transmission, wherein the addressed station has priority over at least one contender in a network, and wherein the at least one contender receives no downlink transmission containing the deterministic slot count,
store the deterministic slot count in the memory,
determine timing of the next transmit opportunity for transmitting the response frame based, at least in part, on the deterministic slot count received in the downlink transmission;
receive a guaranteed start time, the guaranteed start time measured from an end time of the downlink transmission; and
determine the next transmit opportunity for transmitting the response frame based on the guaranteed start time, rather than the deterministic slot count, in response to a condition.

26. The apparatus of claim 25, wherein the at least one processor is further configured to:
transmit the response frame during the next transmit opportunity.

27. The apparatus of claim 25, wherein the at least one processor is configured to determine the timing of the next transmit opportunity by:
counting down by the deterministic slot count after receipt of the downlink transmission.

28. The method of claim 25, wherein the at least one processor is configured to determine the timing of the next transmit opportunity by:
counting down a number of received frames equal to the deterministic slot count after receipt of the downlink transmission.

29. The apparatus of claim 25, wherein the downlink transmission is received via spatial division multiple access (SDMA).

30. The apparatus of claim 25, wherein the downlink transmission comprises a plurality of deterministic slot counts for a corresponding plurality of stations.

31. The apparatus of claim 25, wherein the at least one processor is further configured to receive a CF-end frame.

32. An apparatus for wireless communications, comprising:
at least one processor configured to,
set a network allocation vector (NAV) communication period for downlink transmissions to one or more stations,
send, to an addressed station, a downlink transmission comprising a deterministic slot count and a guaranteed start time, the deterministic slot count indicating a backoff period, for use by the addressed station in determining a next transmit opportunity, wherein the addressed station has priority over at least one contender in a network, and wherein the at least one contender receives no downlink transmission containing a deterministic slot count, the guaranteed start time measured from an end time of the downlink transmission, and receive, prior to expiration of the NAV communication period, an uplink transmission from the addressed station transmitted in the next transmit opportunity, the next transmit opportunity determined one of based on, at least in part, the deterministic slot count or based on the guaranteed start time, rather than the deterministic slot count, in response to a condition; and a memory coupled with the at least one processor.

33. The apparatus of claim 32, wherein the uplink transmission is received in the next transmit opportunity determined based on the deterministic slot count.

34. The apparatus of claim 32, wherein the downlink transmission is sent simultaneously with other downlink transmissions via spatial division multiple access (SDMA).

35. The apparatus of claim 32, wherein the downlink transmission comprises a plurality of deterministic slot counts for a corresponding plurality of stations.

36. The apparatus of claim 32, wherein the at least one processor is further configured to:
 send a CF-End frame indicating an end of the NAV communication period.

37. A computer-program product for wireless communications, comprising a non-transitory computer-readable medium comprising instructions that cause a processing circuit to perform a method comprising:
 receiving a downlink transmission containing a deterministic slot count, the deterministic slot count indicating a backoff period, from a next transmit opportunity, for an addressed station to wait to transmit a response frame to the downlink transmission, wherein the addressed station has priority over at least one contender in a network, and wherein the at least one contender receives no downlink transmission containing the deterministic slot count; and determining timing of the next transmit opportunity for transmitting the response frame based, at least in part, on the deterministic slot count received in the downlink transmission;

receiving, at the addressed station, a guaranteed start time, the guaranteed start time measured from an end time of the downlink transmission; and determining the next transmit opportunity for transmitting the response frame based on the guaranteed start time, rather than the deterministic slot count, in response to a condition.

38. A computer-program product for wireless communications, comprising a non-transitory computer-readable medium comprising instructions that cause a processing circuit to perform a method comprising:
 setting a network allocation vector (NAV) communication period for downlink transmissions to one or more stations;
 sending, to an addressed station, a downlink transmission comprising a deterministic slot count and a guaranteed start time, the deterministic slot count indicating a backoff period, for use by the addressed station in determining a next transmit opportunity, wherein the addressed station has priority over at least one contender in a network, and wherein the at least one contender receives no downlink transmission containing the deterministic slot count, the guaranteed start time measured from an end time of the downlink transmission; and
 receiving, prior to expiration of the NAV communication period, an uplink transmission from the addressed station transmitted in the next transmit opportunity by the addressed station, determined one of based on, at least in part, the deterministic slot count or based on the guaranteed start time, rather than the deterministic slot count, in response to a condition.

* * * * *